US009005014B2

(12) United States Patent
Baerlocher

(10) Patent No.: US 9,005,014 B2
(45) Date of Patent: *Apr. 14, 2015

(54) GAMING SYSTEM AND METHOD WITH MULTIPLE PROGRESSIVE AWARD LEVELS AND A SKILL BASED DETERMINATION OF PROVIDING ONE OF THE PROGRESSIVE AWARD LEVELS

(71) Applicant: IGT, Reno, NV (US)

(72) Inventor: Anthony J. Baerlocher, South Bend, IN (US)

(73) Assignee: IGT, Las Vegas, NV (US)

( * ) Notice: Subject to any disclaimer, the term of this patent is extended or adjusted under 35 U.S.C. 154(b) by 158 days.

This patent is subject to a terminal disclaimer.

(21) Appl. No.: 13/669,984

(22) Filed: Nov. 6, 2012

(65) Prior Publication Data

US 2013/0065677 A1 Mar. 14, 2013

Related U.S. Application Data

(63) Continuation of application No. 13/101,554, filed on May 5, 2011, now Pat. No. 8,328,631, which is a continuation of application No. 11/557,727, filed on Nov. 8, 2006, now Pat. No. 7,963,845.

(51) Int. Cl.
*G06F 17/00* (2006.01)
*A63F 9/24* (2006.01)
(Continued)

(52) U.S. Cl.
CPC . *A63F 9/24* (2013.01); *G07F 17/32* (2013.01); *G07F 17/3258* (2013.01); *G07F 17/34* (2013.01)

(58) Field of Classification Search
USPC .................................................... 463/16–25
See application file for complete search history.

(56) References Cited

U.S. PATENT DOCUMENTS 2,942,574 A 6/1960 Golay
3,618,019 A 11/1971 Nemirovsky
(Continued)

FOREIGN PATENT DOCUMENTS

AU 39363/78 3/1980
AU 1981 66683 8/1981
(Continued)

OTHER PUBLICATIONS

*Aristocrat Technologies Australia Pty. Ltd.* v. *IGT* (Australia) [2007] FCA 37, dated Feb. 7, 2007.
(Continued)

*Primary Examiner* — Ronald Laneau
(74) *Attorney, Agent, or Firm* — Neal, Gerber & Eisenberg LLP

(57) ABSTRACT

A gaming system which includes a plurality of progressive awards in an MLP configuration. In a triggered bonus event, a player begins at the lowest progressive award level of the MLP and attempts to reach a higher progressive award level based on their decisions in the bonus event. If as a result of their play in the bonus event, a player is provided a progressive award other than the lowest level progressive award, one or more of the remaining lower level progressive awards (i.e., a progressive award associated with a lower level of the MLP than the provided progressive award) are shifted to account for the provided progressive award. The lowest level progressive award (which is temporality left vacant by the shifting of the remaining progressive awards) is reset to a set value, thus providing that the progressive award hierarchy is preserved regardless of which progressive award is provided to the player.

30 Claims, 10 Drawing Sheets

(51) Int. Cl.
*G07F 17/32* (2006.01)
*G07F 17/34* (2006.01)

(56) References Cited

U.S. PATENT DOCUMENTS

| | | | |
|---|---|---|---|
| 3,998,309 | A | 12/1976 | Mandas et al. |
| 4,072,930 | A | 2/1978 | Lucero et al. |
| 4,238,127 | A | 12/1980 | Lucero et al. |
| 4,277,064 | A | 7/1981 | Newman |
| 4,283,709 | A | 8/1981 | Lucero et al. |
| 4,335,809 | A | 6/1982 | Wain |
| 4,363,485 | A | 12/1982 | Edwall |
| 4,409,656 | A | 10/1983 | Andersen et al. |
| 4,448,419 | A | 5/1984 | Telnaes |
| 4,494,197 | A | 1/1985 | Troy et al. |
| 4,508,353 | A | 4/1985 | Meyer et al. |
| 4,573,681 | A | 3/1986 | Okada |
| 4,582,324 | A | 4/1986 | Koza et al. |
| 4,618,150 | A | 10/1986 | Kimura |
| 4,624,459 | A | 11/1986 | Kaufman |
| 4,636,951 | A | 1/1987 | Harlick |
| 4,652,998 | A | 3/1987 | Koza et al. |
| 4,657,256 | A | 4/1987 | Okada |
| 4,669,731 | A | 6/1987 | Clarke |
| 4,695,053 | A | 9/1987 | Vazquez, Jr. et al. |
| 4,721,307 | A | 1/1988 | Okada |
| 4,732,386 | A | 3/1988 | Rayffel |
| 4,743,024 | A | 5/1988 | Helm et al. |
| 4,760,527 | A | 7/1988 | Sidley |
| 4,764,666 | A | 8/1988 | Bergeron |
| 4,772,023 | A | 9/1988 | Okada |
| 4,775,155 | A | 10/1988 | Lees |
| 4,805,907 | A | 2/1989 | Hagiwara |
| 4,837,728 | A | 6/1989 | Barrie et al. |
| 4,842,278 | A | 6/1989 | Markowicz |
| 4,844,464 | A | 7/1989 | Berge |
| 4,856,787 | A | 8/1989 | Itkis |
| 4,871,171 | A | 10/1989 | Rivero |
| 4,880,237 | A | 11/1989 | Kishishita |
| 4,926,327 | A | 5/1990 | Sidley |
| 4,964,638 | A | 10/1990 | Ishida |
| 4,991,848 | A | 2/1991 | Greenwood et al. |
| 5,016,880 | A | 5/1991 | Berge |
| 5,038,022 | A | 8/1991 | Lucero |
| 5,048,833 | A | 9/1991 | Lamle |
| 5,072,946 | A | 12/1991 | Miller |
| 5,074,559 | A | 12/1991 | Okada |
| 5,116,055 | A | 5/1992 | Tracy |
| 5,123,649 | A | 6/1992 | Tiberio |
| 5,127,651 | A | 7/1992 | Okada |
| 5,158,293 | A | 10/1992 | Mullins |
| 5,178,390 | A | 1/1993 | Okada |
| 5,205,555 | A | 4/1993 | Humano |
| 5,209,479 | A | 5/1993 | Nagao |
| 5,217,224 | A | 6/1993 | Sincock |
| 5,249,800 | A | 10/1993 | Hilgendorf et al. |
| 5,259,616 | A | 11/1993 | Bergmann |
| 5,265,874 | A | 11/1993 | Dickinson et al. |
| 5,275,400 | A | 1/1994 | Weingardt et al. |
| 5,276,312 | A | 1/1994 | McCarthy |
| 5,277,424 | A | 1/1994 | Wilms |
| 5,280,909 | A | 1/1994 | Tracy |
| 5,282,620 | A | 2/1994 | Keesee |
| 5,286,023 | A | 2/1994 | Wood |
| 5,292,127 | A | 3/1994 | Kelly et al. |
| 5,321,241 | A | 6/1994 | Craine |
| 5,324,035 | A | 6/1994 | Morris et al. |
| 5,324,041 | A | 6/1994 | Boylan et al. |
| 5,326,104 | A | 7/1994 | Pease et al. |
| 5,342,047 | A | 8/1994 | Heidel et al. |
| 5,342,049 | A | 8/1994 | Wichinsky et al. |
| 5,344,144 | A | 9/1994 | Canon |
| 5,351,970 | A | 10/1994 | Fioretti |
| 5,377,993 | A | 1/1995 | Josephs |
| 5,380,008 | A | 1/1995 | Mathis et al. |
| 5,393,057 | A | 2/1995 | Marnell, II |
| 5,398,932 | A | 3/1995 | Eberhardt et al. |
| 5,401,024 | A | 3/1995 | Simunek |
| 5,409,225 | A | 4/1995 | Kelly et al. |
| 5,417,430 | A | 5/1995 | Breeding |
| 5,423,539 | A | 6/1995 | Nagao |
| 5,429,361 | A | 7/1995 | Raven et al. |
| 5,449,173 | A | 9/1995 | Thomas et al. |
| 5,456,465 | A | 10/1995 | Durham |
| 5,470,079 | A | 11/1995 | LeStrange et al. |
| 5,472,194 | A | 12/1995 | Breeding et al. |
| 5,476,259 | A | 12/1995 | Weingardt |
| 5,489,101 | A | 2/1996 | Moody |
| 5,507,489 | A | 4/1996 | Reibel et al. |
| 5,511,781 | A | 4/1996 | Wood |
| 5,524,888 | A | 6/1996 | Heidel |
| 5,536,016 | A | 7/1996 | Thompson |
| 5,542,669 | A | 8/1996 | Charron et al. |
| 5,544,893 | A | 8/1996 | Jones et al. |
| 5,547,192 | A | 8/1996 | Ishibashi |
| 5,560,603 | A | 10/1996 | Seelig et al. |
| 5,564,700 | A | 10/1996 | Celona |
| 5,566,337 | A | 10/1996 | Szymanski |
| 5,570,885 | A | 11/1996 | Ornstein |
| 5,580,053 | A | 12/1996 | Crouch |
| 5,580,309 | A | 12/1996 | Piechowiak et al. |
| 5,584,763 | A | 12/1996 | Kelly et al. |
| 5,601,487 | A | 2/1997 | Oshima |
| 5,605,506 | A | 2/1997 | Hoorn et al. |
| 5,611,535 | A | 3/1997 | Tiberio |
| 5,611,730 | A | 3/1997 | Weiss |
| 5,626,341 | A | 5/1997 | Jones |
| 5,641,050 | A | 6/1997 | Smith et al. |
| 5,645,486 | A | 7/1997 | Nagao et al. |
| 5,655,961 | A | 8/1997 | Acres et al. |
| 5,674,128 | A | 10/1997 | Holch et al. |
| 5,702,304 | A | 12/1997 | Acres et al. |
| 5,707,285 | A | 1/1998 | Place et al. |
| 5,707,286 | A | 1/1998 | Carlson |
| 5,720,483 | A | 2/1998 | Trinh |
| 5,722,891 | A | 3/1998 | Inoue |
| 5,732,948 | A | 3/1998 | Yoseloff |
| 5,741,183 | A | 4/1998 | Acres et al. |
| 5,743,523 | A | 4/1998 | Kelly et al. |
| 5,743,800 | A | 4/1998 | Huard et al. |
| 5,752,882 | A | 5/1998 | Acres et al. |
| 5,761,647 | A | 6/1998 | Boushy |
| 5,762,552 | A | 6/1998 | Vuong |
| 5,766,076 | A | 6/1998 | Pease et al. |
| 5,769,716 | A | 6/1998 | Saffari et al. |
| 5,772,509 | A | 6/1998 | Weiss |
| 5,772,511 | A | 6/1998 | Smeltzer |
| RE35,864 | E | 7/1998 | Weingardt |
| 5,779,545 | A | 7/1998 | Berg et al. |
| 5,779,547 | A | 7/1998 | SoRelle et al. |
| 5,779,549 | A | 7/1998 | Walker et al. |
| 5,788,573 | A | 8/1998 | Baerlocher et al. |
| 5,800,269 | A | 9/1998 | Holch et al. |
| 5,803,451 | A | 9/1998 | Kelly et al. |
| 5,806,855 | A | 9/1998 | Cherry |
| 5,807,172 | A | 9/1998 | Piechowiak |
| 5,816,918 | A | 10/1998 | Kelly et al. |
| 5,820,459 | A | 10/1998 | Acres et al. |
| 5,823,873 | A | 10/1998 | Moody |
| 5,823,874 | A | 10/1998 | Adams |
| 5,833,536 | A | 11/1998 | Davids et al. |
| 5,833,537 | A | 11/1998 | Barrie |
| 5,833,538 | A | 11/1998 | Weiss |
| 5,833,540 | A | 11/1998 | Miodunski et al. |
| 5,836,817 | A | 11/1998 | Acres et al. |
| 5,848,932 | A | 12/1998 | Adams |
| 5,851,011 | A | 12/1998 | Lott |
| 5,851,148 | A | 12/1998 | Brune et al. |
| 5,851,149 | A | 12/1998 | Xidos et al. |
| 5,855,158 | A | 1/1999 | Donofrio |
| 5,855,514 | A | 1/1999 | Kamille |
| 5,855,515 | A | 1/1999 | Pease et al. |
| 5,873,781 | A | 2/1999 | Keane |
| 5,876,284 | A | 3/1999 | Acres et al. |

(56) References Cited

U.S. PATENT DOCUMENTS

| | | | |
|---|---|---|---|
| 5,882,258 | A | 3/1999 | Kelly et al. |
| 5,882,261 | A | 3/1999 | Adams |
| 5,885,158 | A | 3/1999 | Torango et al. |
| 5,902,184 | A | 5/1999 | Bennett |
| 5,902,983 | A | 5/1999 | Crevelt et al. |
| 5,910,048 | A | 6/1999 | Feinberg |
| 5,911,418 | A | 6/1999 | Adams |
| 5,919,088 | A | 7/1999 | Weiss |
| 5,919,091 | A | 7/1999 | Bell et al. |
| 5,935,002 | A | 8/1999 | Falciglia |
| 5,941,773 | A | 8/1999 | Harlick |
| 5,944,314 | A | 8/1999 | Stavinsky |
| 5,944,606 | A | 8/1999 | Gerow |
| 5,947,820 | A | 9/1999 | Morro et al. |
| 5,947,822 | A | 9/1999 | Weiss |
| 5,951,011 | A | 9/1999 | Potter et al. |
| 5,951,397 | A | 9/1999 | Dickinson |
| 5,967,894 | A | 10/1999 | Kinoshita et al. |
| 5,970,143 | A | 10/1999 | Schneier et al. |
| 5,980,384 | A | 11/1999 | Barrie |
| 5,984,779 | A | 11/1999 | Bridgeman et al. |
| 5,988,643 | A | 11/1999 | Awada |
| 5,989,121 | A | 11/1999 | Sakamoto |
| 5,993,316 | A | 11/1999 | Coyle et al. |
| 5,997,400 | A | 12/1999 | Seelig et al. |
| 5,997,401 | A | 12/1999 | Crawford |
| 6,001,016 | A | 12/1999 | Walker et al. |
| 6,004,207 | A | 12/1999 | Wilson, Jr. et al. |
| 6,007,427 | A | 12/1999 | Wiener |
| 6,012,982 | A | 1/2000 | Piechowiak et al. |
| 6,012,983 | A | 1/2000 | Walker et al. |
| 6,015,346 | A | 1/2000 | Bennett |
| 6,030,288 | A | 2/2000 | Davis et al. |
| 6,039,648 | A | 3/2000 | Guinn et al. |
| 6,039,649 | A | 3/2000 | Schulze |
| 6,047,963 | A | 4/2000 | Pierce et al. |
| 6,048,269 | A | 4/2000 | Burns et al. |
| 6,050,895 | A | 4/2000 | Luciano, Jr. et al. |
| 6,056,642 | A | 5/2000 | Bennett |
| 6,059,289 | A | 5/2000 | Vancura |
| 6,059,658 | A | 5/2000 | Mangano et al. |
| 6,062,981 | A | 5/2000 | Luciano, Jr. |
| 6,068,553 | A | 5/2000 | Parker |
| 6,077,162 | A | 6/2000 | Weiss |
| 6,080,062 | A | 6/2000 | Olson |
| 6,089,976 | A | 7/2000 | Schneider et al. |
| 6,089,977 | A | 7/2000 | Bennett |
| 6,089,978 | A | 7/2000 | Adams |
| 6,089,980 | A | 7/2000 | Gauselmann |
| 6,099,408 | A | 8/2000 | Schneier et al. |
| 6,102,798 | A | 8/2000 | Bennett |
| 6,105,962 | A | 8/2000 | Malavazos et al. |
| 6,110,039 | A | 8/2000 | Oh |
| 6,110,041 | A | 8/2000 | Walker et al. |
| 6,110,043 | A | 8/2000 | Olsen |
| 6,117,013 | A | 9/2000 | Eiba |
| 6,120,031 | A | 9/2000 | Adams |
| 6,126,541 | A | 10/2000 | Fuchs |
| 6,126,542 | A | 10/2000 | Fier |
| 6,126,547 | A | 10/2000 | Ishimoto |
| 6,129,355 | A | 10/2000 | Hahn et al. |
| 6,135,884 | A | 10/2000 | Hedrick et al. |
| 6,135,885 | A | 10/2000 | Lermusiaux |
| 6,139,013 | A | 10/2000 | Pierce et al. |
| 6,142,872 | A | 11/2000 | Walker et al. |
| 6,142,873 | A | 11/2000 | Weiss et al. |
| 6,142,874 | A | 11/2000 | Kodachi et al. |
| 6,146,270 | A | 11/2000 | Huard et al. |
| 6,146,273 | A | 11/2000 | Olsen |
| 6,149,521 | A | 11/2000 | Sanduski |
| 6,152,823 | A | 11/2000 | Lacoste et al. |
| 6,155,925 | A | 12/2000 | Giobbi et al. |
| 6,159,097 | A | 12/2000 | Gura |
| 6,159,098 | A | 12/2000 | Slomiany et al. |
| 6,162,121 | A | 12/2000 | Morro et al. |
| 6,162,122 | A | 12/2000 | Acres et al. |
| 6,164,652 | A | 12/2000 | Lauretta et al. |
| 6,165,070 | A | 12/2000 | Nolte et al. |
| 6,167,523 | A | 12/2000 | Strong |
| 6,168,520 | B1 | 1/2001 | Baerlocher et al. |
| 6,173,955 | B1 | 1/2001 | Perrie et al. |
| 6,174,233 | B1 | 1/2001 | Sunaga et al. |
| 6,174,235 | B1 | 1/2001 | Walker et al. |
| 6,183,366 | B1 | 2/2001 | Goldberg et al. |
| 6,186,894 | B1 | 2/2001 | Mayeroff |
| 6,190,255 | B1 | 2/2001 | Thomas et al. |
| 6,203,010 | B1 | 3/2001 | Jorasch et al. |
| 6,203,430 | B1 | 3/2001 | Walker et al. |
| 6,206,374 | B1 | 3/2001 | Jones |
| 6,210,275 | B1 | 4/2001 | Olsen |
| 6,210,276 | B1 | 4/2001 | Mullins |
| 6,210,277 | B1 | 4/2001 | Stefan |
| 6,210,279 | B1 | 4/2001 | Dickinson |
| 6,217,448 | B1 | 4/2001 | Olsen |
| 6,220,593 | B1 | 4/2001 | Pierce et al. |
| 6,220,961 | B1 | 4/2001 | Keane et al. |
| 6,224,482 | B1 | 5/2001 | Bennett |
| 6,224,483 | B1 | 5/2001 | Mayeroff |
| 6,224,484 | B1 | 5/2001 | Okuda et al. |
| 6,227,969 | B1 | 5/2001 | Yoseloff |
| 6,227,971 | B1 | 5/2001 | Weiss |
| 6,231,442 | B1 | 5/2001 | Mayeroff |
| 6,231,445 | B1 | 5/2001 | Acres |
| 6,234,896 | B1 | 5/2001 | Walker et al. |
| 6,234,897 | B1 | 5/2001 | Frohm et al. |
| 6,238,288 | B1 | 5/2001 | Walker et al. |
| 6,244,958 | B1 | 6/2001 | Acres |
| 6,254,483 | B1 | 7/2001 | Acres |
| 6,257,981 | B1 | 7/2001 | Acres et al. |
| 6,261,177 | B1 | 7/2001 | Bennett |
| 6,264,557 | B1 | 7/2001 | Schneier et al. |
| 6,267,669 | B1 | 7/2001 | Luciano, Jr. et al. |
| 6,270,409 | B1 | 8/2001 | Shuster |
| 6,287,194 | B1 | 9/2001 | Okada et al. |
| 6,287,202 | B1 | 9/2001 | Pascal et al. |
| 6,293,866 | B1 | 9/2001 | Walker et al. |
| RE37,414 | E | 10/2001 | Harlick |
| 6,299,165 | B1 | 10/2001 | Nagano |
| 6,302,790 | B1 | 10/2001 | Brossard |
| 6,302,793 | B1 | 10/2001 | Fertitta, III et al. |
| 6,302,794 | B1 | 10/2001 | Ogawa |
| 6,305,686 | B1 | 10/2001 | Perrie et al. |
| 6,309,298 | B1 | 10/2001 | Gerow |
| 6,309,299 | B1 | 10/2001 | Weiss |
| 6,309,300 | B1 | 10/2001 | Glavich |
| 6,311,976 | B1 | 11/2001 | Yoseloff et al. |
| 6,312,330 | B1 | 11/2001 | Jones et al. |
| 6,312,333 | B1 | 11/2001 | Acres |
| 6,312,334 | B1 | 11/2001 | Yoseloff |
| 6,315,662 | B1 | 11/2001 | Jorasch et al. |
| 6,315,663 | B1 | 11/2001 | Sakamoto |
| 6,319,122 | B1 | 11/2001 | Packes, Jr. et al. |
| 6,319,125 | B1 | 11/2001 | Acres |
| 6,328,649 | B1 | 12/2001 | Randall et al. |
| 6,334,814 | B1 | 1/2002 | Adams |
| 6,336,857 | B1 | 1/2002 | McBride |
| 6,336,860 | B1 | 1/2002 | Webb |
| 6,340,158 | B2 | 1/2002 | Pierce et al. |
| 6,346,043 | B1 | 2/2002 | Colin et al. |
| 6,347,738 | B1 | 2/2002 | Crevelt et al. |
| 6,347,996 | B1 | 2/2002 | Gilmore et al. |
| 6,354,593 | B1 | 3/2002 | Frommer et al. |
| 6,358,147 | B1 | 3/2002 | Jaffe et al. |
| 6,358,149 | B1 | 3/2002 | Schneider et al. |
| 6,361,441 | B1 | 3/2002 | Walker et al. |
| 6,364,766 | B1 | 4/2002 | Anderson et al. |
| 6,364,768 | B1 | 4/2002 | Acres et al. |
| 6,364,769 | B1 | 4/2002 | Weiss et al. |
| 6,371,852 | B1 | 4/2002 | Acres |
| 6,375,567 | B1 | 4/2002 | Acres |
| 6,375,568 | B1 | 4/2002 | Roffman et al. |
| 6,375,569 | B1 | 4/2002 | Acres |
| 6,386,977 | B1 | 5/2002 | Hole |
| 6,398,218 | B1 | 6/2002 | Vancura |

(56) References Cited

U.S. PATENT DOCUMENTS

| | | | |
|---|---|---|---|
| 6,406,369 | B1 | 6/2002 | Baerlocher et al. |
| 6,409,602 | B1 | 6/2002 | Wiltshire et al. |
| 6,416,408 | B2 | 7/2002 | Tracy et al. |
| 6,416,409 | B1 | 7/2002 | Jordan |
| 6,419,579 | B1 | 7/2002 | Bennett |
| 6,419,583 | B1 | 7/2002 | Crumby et al. |
| 6,428,412 | B1 | 8/2002 | Anderson et al. |
| 6,431,983 | B2 | 8/2002 | Acres |
| 6,435,511 | B1 | 8/2002 | Vancura et al. |
| 6,435,968 | B1 | 8/2002 | Torango |
| 6,454,651 | B1 | 9/2002 | Yoseloff |
| RE37,885 | E | 10/2002 | Acres et al. |
| 6,461,241 | B1 | 10/2002 | Webb et al. |
| 6,471,208 | B2 | 10/2002 | Yoseloff et al. |
| 6,471,591 | B1 | 10/2002 | Crumby |
| 6,475,088 | B1 | 11/2002 | Jones et al. |
| 6,481,713 | B2 | 11/2002 | Perrie et al. |
| 6,511,376 | B2 | 1/2003 | Walker et al. |
| 6,533,664 | B1 | 3/2003 | Crumby |
| 6,537,150 | B1 | 3/2003 | Luciano et al. |
| 6,546,134 | B1 | 4/2003 | Shrairman et al. |
| 6,546,374 | B1 | 4/2003 | Esposito et al. |
| 6,547,131 | B1 | 4/2003 | Foodman et al. |
| 6,554,283 | B2 | 4/2003 | Vancura et al. |
| 6,554,705 | B1 | 4/2003 | Cumbers |
| 6,561,904 | B2 | 5/2003 | Locke et al. |
| 6,565,434 | B1 | 5/2003 | Acres |
| 6,569,015 | B1 | 5/2003 | Baerlocher et al. |
| 6,572,471 | B1 | 6/2003 | Bennett |
| 6,572,473 | B1 | 6/2003 | Baerlocher |
| 6,575,832 | B1 | 6/2003 | Manfredi et al. |
| 6,589,115 | B2 | 7/2003 | Walker et al. |
| 6,592,460 | B2 | 7/2003 | Torango |
| 6,595,853 | B1 | 7/2003 | Osawa |
| 6,599,185 | B1 | 7/2003 | Kaminkow et al. |
| 6,599,190 | B2 | 7/2003 | Osawa |
| 6,599,193 | B2 | 7/2003 | Baerlocher et al. |
| 6,607,438 | B2 | 8/2003 | Baerlocher et al. |
| 6,607,441 | B1 | 8/2003 | Acres |
| 6,609,973 | B1 | 8/2003 | Weiss |
| 6,620,046 | B2 | 9/2003 | Rowe |
| 6,626,758 | B1 | 9/2003 | Parham et al. |
| 6,634,944 | B2 | 10/2003 | Osawa |
| 6,637,747 | B1 | 10/2003 | Garrod |
| 6,645,069 | B2 | 11/2003 | Robb |
| 6,645,074 | B2 | 11/2003 | Thomas et al. |
| 6,645,077 | B2 | 11/2003 | Rowe |
| 6,648,759 | B2 | 11/2003 | Vancura |
| 6,648,762 | B2 | 11/2003 | Walker et al. |
| 6,656,047 | B1 | 12/2003 | Tarantino et al. |
| 6,656,048 | B2 | 12/2003 | Olsen |
| 6,656,052 | B2 | 12/2003 | Abramopoulos et al. |
| 6,672,959 | B2 | 1/2004 | Moody et al. |
| 6,675,152 | B1 | 1/2004 | Prasad et al. |
| 6,682,419 | B2 | 1/2004 | Webb et al. |
| 6,682,420 | B2 | 1/2004 | Webb et al. |
| 6,682,421 | B1 | 1/2004 | Rowe et al. |
| 6,692,355 | B2 | 2/2004 | Baerlocher et al. |
| 6,702,674 | B1 | 3/2004 | De Bruin et al. |
| 6,712,695 | B2 | 3/2004 | Mothwurf et al. |
| 6,712,697 | B2 | 3/2004 | Acres |
| 6,719,630 | B1 | 4/2004 | Seelig et al. |
| 6,733,389 | B2 | 5/2004 | Webb et al. |
| 6,746,328 | B2 | 6/2004 | Cannon et al. |
| 6,749,502 | B2 | 6/2004 | Baerlocher |
| 6,749,510 | B2 | 6/2004 | Giobbi |
| 6,754,346 | B2 | 6/2004 | Eiserling et al. |
| 6,761,632 | B2 | 7/2004 | Bansemer et al. |
| 6,776,714 | B2 | 8/2004 | Ungaro et al. |
| 6,776,715 | B2 | 8/2004 | Price |
| 6,780,111 | B2 | 8/2004 | Cannon et al. |
| 6,790,141 | B2 | 9/2004 | Muir |
| 6,793,578 | B2 | 9/2004 | Luccesi et al. |
| 6,800,030 | B2 | 10/2004 | Acres |
| 6,805,352 | B2 | 10/2004 | Hunter |
| 6,811,483 | B1 | 11/2004 | Webb et al. |
| 6,832,956 | B1 | 12/2004 | Boyd et al. |
| 6,832,958 | B2 | 12/2004 | Acres et al. |
| 6,837,788 | B2 | 1/2005 | Cannon |
| 6,837,793 | B2 | 1/2005 | McClintic |
| 6,852,027 | B2 | 2/2005 | Kaminkow et al. |
| 6,857,958 | B2 | 2/2005 | Osawa |
| 6,863,606 | B1 | 3/2005 | Berg et al. |
| 6,869,361 | B2 | 3/2005 | Sharpless et al. |
| 6,884,168 | B2 | 4/2005 | Wood et al. |
| 6,887,154 | B1 | 5/2005 | Luciano, Jr. et al. |
| 6,889,849 | B2 | 5/2005 | Heidel et al. |
| 6,899,625 | B2 | 5/2005 | Luciano, Jr. et al. |
| 6,908,387 | B2 | 6/2005 | Hedrick et al. |
| 6,910,964 | B2 | 6/2005 | Acres |
| 6,918,832 | B2 | 7/2005 | Baerlocher et al. |
| 6,918,834 | B2 | 7/2005 | Vancura |
| 6,932,707 | B2 | 8/2005 | Duhamel |
| 6,935,951 | B2 | 8/2005 | Paulsen et al. |
| 6,935,958 | B2 | 8/2005 | Nelson |
| 6,939,234 | B2 | 9/2005 | Beatty |
| 6,942,568 | B2 | 9/2005 | Baerlocher |
| RE38,812 | E | 10/2005 | Acres et al. |
| 6,966,834 | B1 | 11/2005 | Johnson |
| 6,981,917 | B2 | 1/2006 | Webb et al. |
| 6,984,173 | B1 | 1/2006 | Piechowiak et al. |
| 7,056,215 | B1 | 6/2006 | Olive |
| 7,066,813 | B1 | 6/2006 | Sakamoto et al. |
| 7,204,756 | B2 | 4/2007 | Jubinville et al. |
| 7,666,093 | B2 | 2/2010 | Lafky et al. |
| 7,780,520 | B2 | 8/2010 | Baerlocher |
| 7,963,845 | B2 * | 6/2011 | Baerlocher ..................... 463/25 |
| 8,070,597 | B2 | 12/2011 | Cuddy |
| 2001/0024971 | A1 | 9/2001 | Brossard |
| 2001/0049303 | A1 | 12/2001 | Found |
| 2001/0055990 | A1 | 12/2001 | Acres |
| 2002/0002674 | A1 | 1/2002 | Grimes et al. |
| 2002/0025847 | A1 | 2/2002 | Thomas et al. |
| 2002/0071557 | A1 | 6/2002 | Nguyen |
| 2002/0116615 | A1 | 8/2002 | Nguyen et al. |
| 2002/0138594 | A1 | 9/2002 | Rowe |
| 2002/0152120 | A1 | 10/2002 | Howington |
| 2002/0160825 | A1 | 10/2002 | Nicastro et al. |
| 2002/0165023 | A1 | 11/2002 | Brosnan et al. |
| 2002/0187834 | A1 | 12/2002 | Rowe et al. |
| 2003/0027625 | A1 | 2/2003 | Rowe |
| 2003/0027630 | A1 | 2/2003 | Kelly et al. |
| 2003/0028480 | A1 | 2/2003 | Rowe |
| 2003/0045350 | A1 | 3/2003 | Baerlocher et al. |
| 2003/0045353 | A1 | 3/2003 | Paulsen et al. |
| 2003/0050111 | A1 | 3/2003 | Saffari |
| 2003/0054878 | A1 | 3/2003 | Benoy et al. |
| 2003/0060266 | A1 | 3/2003 | Baerlocher |
| 2003/0060269 | A1 | 3/2003 | Paulsen et al. |
| 2003/0060279 | A1 | 3/2003 | Torango |
| 2003/0083943 | A1 | 5/2003 | Adams et al. |
| 2003/0092484 | A1 | 5/2003 | Schneider et al. |
| 2003/0144965 | A1 | 7/2003 | Prasad et al. |
| 2003/0181231 | A1 | 9/2003 | Vancura et al. |
| 2003/0182574 | A1 | 9/2003 | Whitten et al. |
| 2003/0199321 | A1 | 10/2003 | Williams |
| 2003/0211879 | A1 | 11/2003 | Englman |
| 2003/0211884 | A1 | 11/2003 | Gauselmann |
| 2003/0222402 | A1 | 12/2003 | Olive |
| 2003/0223803 | A1 | 12/2003 | De Schrijver |
| 2003/0228904 | A1 | 12/2003 | Acres et al. |
| 2003/0232647 | A1 | 12/2003 | Moser |
| 2003/0236116 | A1 | 12/2003 | Marks et al. |
| 2004/0009811 | A1 | 1/2004 | Torango |
| 2004/0072615 | A1 | 4/2004 | Maya et al. |
| 2004/0087368 | A1 | 5/2004 | Gauselmann |
| 2004/0219962 | A1 | 11/2004 | Vancura |
| 2004/0242297 | A1 | 12/2004 | Walker |
| 2005/0012818 | A1 | 1/2005 | Kiely et al. |
| 2005/0026694 | A1 | 2/2005 | Kelly et al. |
| 2005/0032573 | A1 | 2/2005 | Acres et al. |
| 2005/0059467 | A1 | 3/2005 | Saffari et al. |
| 2005/0070353 | A1 | 3/2005 | Webb et al. |
| 2005/0070356 | A1 | 3/2005 | Mothwurf |

(56) References Cited

U.S. PATENT DOCUMENTS

| | | | |
|---|---|---|---|
| 2005/0079908 | A1 | 4/2005 | Pacey |
| 2005/0079911 | A1 | 4/2005 | Nakatsu |
| 2005/0086478 | A1 | 4/2005 | Peinado et al. |
| 2005/0096125 | A1 | 5/2005 | LeMay et al. |
| 2005/0101374 | A1 | 5/2005 | Acres |
| 2005/0101375 | A1 | 5/2005 | Webb et al. |
| 2005/0101384 | A1 | 5/2005 | Parham |
| 2005/0119047 | A1 | 6/2005 | Olive |
| 2005/0143168 | A1 | 6/2005 | Torango |
| 2005/0143169 | A1 | 6/2005 | Nguyen et al. |
| 2005/0159211 | A1 | 7/2005 | Englman |
| 2005/0163377 | A1 | 7/2005 | Walch |
| 2005/0176488 | A1 | 8/2005 | Olive |
| 2005/0178716 | A1 | 8/2005 | Suri |
| 2005/0192083 | A1 | 9/2005 | Iwamoto |
| 2005/0192099 | A1 | 9/2005 | Nguyen et al. |
| 2005/0209004 | A1 | 9/2005 | Torango |
| 2005/0239542 | A1 | 10/2005 | Olsen |
| 2005/0267610 | A1 | 12/2005 | Shinoda |
| 2005/0282626 | A1 | 12/2005 | Manfredi et al. |
| 2005/0282629 | A1 | 12/2005 | Gagner |
| 2006/0003829 | A1 | 1/2006 | Thomas |
| 2006/0009285 | A1 | 1/2006 | Pryzby et al. |
| 2006/0025210 | A1 | 2/2006 | Johnson |
| 2006/0026604 | A1 | 2/2006 | Tan et al. |
| 2006/0030397 | A1 | 2/2006 | Chan |
| 2006/0030403 | A1 | 2/2006 | Lafky et al. |
| 2006/0035694 | A1 | 2/2006 | Fuller |
| 2006/0035705 | A1 | 2/2006 | Jordan et al. |
| 2006/0035706 | A1 | 2/2006 | Thomas et al. |
| 2006/0036552 | A1 | 2/2006 | Gunyakti et al. |
| 2006/0040732 | A1 | 2/2006 | Baerlocher et al. |
| 2006/0040735 | A1 | 2/2006 | Baerlocher |
| 2006/0052159 | A1 | 3/2006 | Cahill et al. |
| 2006/0052161 | A1 | 3/2006 | Soukup et al. |
| 2006/0052162 | A1 | 3/2006 | Soukup et al. |
| 2006/0068897 | A1 | 3/2006 | Sanford et al. |
| 2006/0073887 | A1 | 4/2006 | Nguyen et al. |
| 2006/0073889 | A1 | 4/2006 | Edidin et al. |
| 2006/0073897 | A1 | 4/2006 | Englman et al. |
| 2006/0154718 | A1 | 7/2006 | Willyard et al. |
| 2006/0183537 | A1 | 8/2006 | Dickerson |
| 2006/0183538 | A1 | 8/2006 | Michaelson et al. |
| 2006/0287077 | A1 | 12/2006 | Grav et al. |
| 2006/0292529 | A1 | 12/2006 | De Ley et al. |
| 2007/0087824 | A1 | 4/2007 | Ogiwara |
| 2007/0213114 | A1 | 9/2007 | Caspers et al. |
| 2007/0218982 | A1* | 9/2007 | Baerlocher ..................... 463/27 |
| 2007/0259711 | A1 | 11/2007 | Thomas |
| 2008/0015012 | A1 | 1/2008 | Englman et al. |
| 2008/0039191 | A1 | 2/2008 | Cuddy et al. |
| 2008/0108423 | A1 | 5/2008 | Benbrahim et al. |
| 2008/0108431 | A1 | 5/2008 | Cuddy et al. |
| 2010/0227677 | A1 | 9/2010 | Baerlocher |
| 2011/0003637 | A1* | 1/2011 | LeFever .......................... 463/27 |
| 2011/0111828 | A1* | 5/2011 | Caputo et al. ................... 463/20 |
| 2012/0046098 | A1 | 2/2012 | Cuddy |

FOREIGN PATENT DOCUMENTS

| | | |
|---|---|---|
| AU | 524709 | 9/1982 |
| AU | 542455 | 2/1985 |
| AU | 555905 | 10/1986 |
| AU | 567001 | 11/1987 |
| AU | 585160 | 6/1989 |
| AU | 589158 | 10/1989 |
| AU | 593059 | 2/1990 |
| AU | 630112 | 3/1990 |
| AU | 628330 | 9/1992 |
| AU | 633469 | 1/1993 |
| AU | 667210 | 2/1993 |
| AU | 680920 | 2/1994 |
| AU | 649009 | 5/1994 |
| AU | 656302 | 8/1994 |
| AU | 655801 | 1/1995 |
| AU | 704365 | 6/1997 |
| AU | 704372 | 6/1997 |
| AU | PO 7780 | 7/1997 |
| AU | PO 9090 | 9/1997 |
| AU | 1996 50327 | 10/1997 |
| AU | 690499 | 1/1998 |
| AU | 1996 62115 | 2/1998 |
| AU | 722902 | 6/1998 |
| AU | 1997 43615 | 7/1998 |
| AU | 680602 | 7/1998 |
| AU | 755826 | 8/1998 |
| AU | 733963 | 9/1998 |
| AU | 1998 63553 | 10/1998 |
| AU | 743079 | 11/1998 |
| AU | 1998 84162 | 3/1999 |
| AU | 738686 | 3/1999 |
| AU | 736679 | 5/1999 |
| AU | 707687 | 7/1999 |
| AU | 1999 17318 | 9/1999 |
| AU | 709724 | 9/1999 |
| AU | 768285 | 9/1999 |
| AU | 711501 | 10/1999 |
| AU | 746082 | 10/1999 |
| AU | 756180 | 10/1999 |
| AU | 753102 | 11/1999 |
| AU | 765084 | 11/1999 |
| AU | 760617 | 1/2000 |
| AU | 716299 | 2/2000 |
| AU | 721968 | 7/2000 |
| AU | 722107 | 7/2000 |
| AU | 728788 | 1/2001 |
| AU | 744569 | 3/2001 |
| AU | 771847 | 3/2001 |
| AU | 2001 1000032 | 11/2001 |
| AU | 2001 1000033 | 11/2001 |
| AU | 748263 | 5/2002 |
| AU | 749222 | 6/2002 |
| AU | 754689 | 11/2002 |
| AU | 758306 | 3/2003 |
| AU | 1999 43453 | 4/2003 |
| DE | 3415114 | 10/1985 |
| DE | 3917683 | 12/1990 |
| DE | 4200254 | 8/1993 |
| EP | 0 342 797 | 11/1989 |
| EP | 0 444 932 | 2/1991 |
| EP | 0 420 586 | 4/1991 |
| EP | 0 443 420 | 1/1995 |
| EP | 0 798 676 | 10/1997 |
| EP | 0 874 337 | 10/1998 |
| EP | 0 952 563 | 2/1999 |
| EP | 0 926 645 | 6/1999 |
| EP | 0 944 030 | 9/1999 |
| EP | 1 637 196 | 9/2004 |
| EP | 1 467 329 | 10/2004 |
| EP | 1 498 860 | 1/2005 |
| EP | 1 513 114 | 3/2005 |
| EP | 1 528 516 | 5/2005 |
| EP | 1 528 517 | 5/2005 |
| GB | 2 096 376 | 10/1982 |
| GB | 2 097 160 | 10/1982 |
| GB | 2 100 905 | 1/1983 |
| GB | 2 118 445 | 11/1983 |
| GB | 2 142 457 | 6/1984 |
| GB | 2 137 392 | 10/1984 |
| GB | 2 139 390 | 11/1984 |
| GB | 2 147 773 | 5/1985 |
| GB | 2 148 135 | 5/1985 |
| GB | 1 151 054 | 7/1985 |
| GB | 2 153 572 | 8/1985 |
| GB | 2 161 008 | 1/1986 |
| GB | 2 161 009 | 1/1986 |
| GB | 2 170 636 | 8/1986 |
| GB | 2 180 682 | 4/1987 |
| GB | 2 181 589 | 4/1987 |
| GB | 2 183 882 | 6/1987 |
| GB | 2 222 712 | 3/1990 |
| GB | 2 226 907 | 7/1990 |
| GB | 2 231 189 | 11/1990 |

(56) References Cited

FOREIGN PATENT DOCUMENTS

| | | |
|---|---|---|
| GB | 2 282 690 | 4/1995 |
| GB | 2 328 311 | 2/1999 |
| GB | 2 387 703 | 10/2003 |
| JP | 7148307 | 6/1995 |
| WO | WO 94 12256 | 6/1994 |
| WO | WO 95 22811 | 8/1995 |
| WO | WO 95 30944 | 11/1995 |
| WO | WO 96/12262 | 4/1996 |
| WO | WO 96/24421 | 8/1996 |
| WO | WO 97 12338 | 4/1997 |
| WO | WO 97 27568 | 7/1997 |
| WO | WO 97/32285 | 9/1997 |
| WO | WO 98 35309 | 8/1998 |
| WO | WO 98 47115 | 10/1998 |
| WO | WO 98 51384 | 11/1998 |
| WO | WO 99 03078 | 1/1999 |
| WO | WO 99 10849 | 3/1999 |
| WO | WO 99 60498 | 11/1999 |
| WO | WO 00 12186 | 3/2000 |
| WO | WO 00 32286 | 6/2000 |
| WO | WO 01 10523 | 2/2001 |
| WO | WO 01 15055 | 3/2001 |
| WO | WO 01 15790 | 3/2001 |
| WO | WO 03 063019 | 7/2003 |
| WO | WO 03 075235 | 9/2003 |
| WO | WO 03 030066 | 10/2003 |
| WO | WO 2004 035161 | 4/2004 |
| WO | WO 2004 066061 | 8/2004 |
| WO | WO 2005 027058 | 3/2005 |
| WO | WO 2005 076193 | 8/2005 |
| WO | WO 2005 081623 | 9/2005 |
| WO | WO 2005 083599 | 9/2005 |
| WO | WO 2005 099425 | 10/2005 |
| WO | WO 2005 099845 | 10/2005 |
| WO | WO 2005 106702 | 11/2005 |
| WO | WO 2005 113093 | 12/2005 |
| WO | WO 2006 014770 | 2/2006 |
| WO | WO 2006 014833 | 2/2006 |
| WO | WO 2006 039366 | 4/2006 |

OTHER PUBLICATIONS

Aristocrat Brochure, written by Aristocrat Gaming, published in 2004.
Aristocrat Buyer's Guide with ACES Ad, 2pp. (Mar.-May 1989).
Atronic Systems Progressive Products at G2E, published by Atronic in 2004, printed from ForRelease.com.
Auction Fever Advertisement, written by Sierra Design Group, available prior to 2004.
Bally Slot Machines Electro-Mechanicals 1964-1980 Book [In Part], Revised 3rd Edition written by Marshall Fey.
Believe it or Not Article, written by Strictly Slots, published in 2001.
Bingo Advertisement and Jackpot Bingo Advertisements, written by Casino Data Systems, published in 1998 and 2001.
Bonus Spin Diamond Fives Advertisement, written by IGT, published in 1999.
Bonus Times Article, written by Strictly Slots, published in Jul. 2000.
Boom Advertisement, written by WMS Gaming, Inc., published in 1998.
Cartoon Jackpots description, printed from www.ballygaming.com/home.asp, on Feb. 4, 2005.
Cash Box Advertisement, written by Anchor Games, published in 2000.
Cash Express Advertisements, written by Aristocrat, published in 2002.
Catalogue of Champions Advertisement, written by Aristocrat, published in 1990.
Computa Game Equipment Manual written and compiled by Russell Campbell, Sep. 1990.
Computa Game, "The Software Manual", Revision 3 for Computa Game Software Version 2.41 written by Clive Davis et al., published by Computa Game Pty Ltd., Jul. 1991.
Double Spin Five Times Pay Advertisement, written by IGT, published prior to 2000.
Excerpt from Local Area Electronic Gaming Machine Communications Protocol, QCOM Version 1.5, by Queensland Treasury Office of Gaming Regulation printed February.
FAST BUCK Systems Manual, written by International Game Technology, available to Mirage shift supervisors at least as early as May 30, 1990.
Federal Court of Australia, *Jupiter's Ltd* v. *Neurizon Pty Ltd* [2005] FCAFC 90 (including description of Activadata gaming system), dated May 26, 2005.
Federal Court of Australia, *Neurizon Pty Ltd* v. *Jupiter's Ltd* [2004] FCA 1012 (including description of Activdata gaming system), dated Oct. 21, 2004.
Federal Court of Australia, *Neurizon Pty Ltd.* v. *LTH Consulting and Marketing Services Pty. Ltd.* [2002] FCA 1547 (including description of Mega Gold System), dated Dec. 13, 2002.
Full House Advertisement, written by Anchor Games, published in 2000.
Gold Fever Advertisement and Game Description written Casino Data System, published in 1997.
Integrated Real Time On-Line Slot System—SDI, written by GRIPS Electronic GmbH, printed from website reported as archived on Feb. 20, 1997 (available at http://web.archive.org/web/19970220165559/www.grips.com/sdi.htm).
Jackpot Carnival Hyperlink Advertisement, written by Aristocrat, published prior to 2002.
Jewel in the Crown Advertisement, written by IGT, published in 2000.
Lemons, Cherries and Bell-Fruit-Gum, pp. 1 to 4 and 304 to 314, written by Bueschel, published in Royal Bell Books in Nov. 1995.
Mega Multiplier®, printed from www.wmsgaming.com, on May 22, 2001.
Mikohn Product Catalog, Chapters 1, 2, 6, 7 and 8, written by Mikohn, published in Jan. 1993.
Mikohn Supper Controller Manual, Chapters 1 to 3 and 6 to 7, written by Mikohn, published in 1989.
Millioni$er articles, written by Strictly Slots, published in Sep. 2003 and Mar. 2004.
Money Time advertisement, written by Mikohn Gaming, published in 1999.
M-Slot Series Primary Reel Product description from Lemons, Cherries and Bell-Fruit-Gum, written by Richard M. Bueschel, published in 1995.
PEM—Precision Electronic Meter, written by GRIPS Electronic GmbH, printed from website reported as archived on Feb. 20, 1997 (available at http://web.archive.org/web/19970220165753/www.grips.com/pem.htm).
Penguin Pucks article, written by Note in Gaming Marketplace, published prior to 2004.
Player Tracking on Slots, written by GRIPS Electronic GmbH, printed from website reported as archived on Feb. 20, 1997 (available at http://web.archive.org/web/19970220165921/www.grips.com/playtrac.htm).
Progressive Jackpot System article, printed from casinomagazine.com.managearticle.asp@c_290&a=518, on Jun. 21, 2004.
ProLINK Progressive Controller User/Reference Manual, written by Casino Data Systems, published in Apr. 1997.
Slot Line Progressive Advertisement, written by IGT, published in 1993.
Slot Line Progressive Advertisement, written by IGT, published in 1994.
Slot Line Progressive Advertisement, written by IGT, published in 1995.
Slot Line Progressive Mega Jackpots Advertisement, written by IGT, published in 1997.
Slot Line Temperature Rising Game Description, written by IGT, published in 1998.
Slot Machines A Pictorial History of the First 100 Years (pp. 216, 242 to 243), 5th edition, written by Marshall Fey, published in 1983-1997.
Super Cherry Advertisement, written by IGT, published in 2001.
Surprize Gaming Machine Advertisement, written by Aristocrat Leisure Industries, Australia, published prior to 2004.

(56) References Cited

OTHER PUBLICATIONS

Take Your Pick Article, written by Strictly Slots, published in Mar. 2001.
Uno Game Illustration written by Marshall Fey, published in 1983, 1989, 1991, 1994 and 1997.
Uno Original Instructions, Mattel, Inc., 1998.
Vision Series Good Times Advertisement, written by IGT, published in 1999.
Wide Area Progressive Link System, written by GRIPS Electronic GmbH, printed from website reported as archived on Feb. 20, 1997 (available at http://web.archive.org/web/19970220165457/www.grips.com/wap.htm).
Zorro Advertisement, written by Aristocrat, published in 2004.
Letter from Marvin Motsenbocker of Mots Law dated Oct. 31, 2011 regarding Third Party Submission in Published Application Under 37 C.F.R. 1.99 filed for U.S. Appl. No. 13/101,554 (1 page).
Third Party Submission in Published Application Under 37 C.F.R. 1.99 filed for U.S. Appl. No. 13/101,554, dated Oct. 31, 2011 (3 pages).
Partially highlighted U.S. Patent Application Publication No. 2007/0087824 submitted with Third Party Submission in Published Application Under 37 C.F.R. 1.99 for U.S. Appl. No. 13/101,554 (2 pages).
Partially highlighted U.S. Patent No. 6,609,973 submitted with Third Party Submission in Published Application Under 37 C.F.R. 1.99 for U.S. Appl. No. 13/101,554 (2 pages).

* cited by examiner

FIG. 5A

| Progressive Award Level | Progressive Award Value |
|---|---|
| Progressive Award #7 | $10.40 |
| Progressive Award #6 | $9.68 |
| Progressive Award #5 | $8.60 |
| Progressive Award #4 | $7.34 |
| Progressive Award #3 | $6.44 |
| Progressive Award #2 | $6.11 |
| Progressive Award #1 | $5.18 |

FIG. 5B

| Progressive Award Level | Progressive Award Value |
|---|---|
| Progressive Award #7 | $10.40 |
| Progressive Award #6 | $9.68 |
| Progressive Award #5 | $8.60 |
| Progressive Award #4 | $6.44 |
| Progressive Award #3 | $6.11 |
| Progressive Award #2 | $5.18 |
| Progressive Award #1 | $5.00 |

GAMING SYSTEM AND METHOD WITH MULTIPLE PROGRESSIVE AWARD LEVELS AND A SKILL BASED DETERMINATION OF PROVIDING ONE OF THE PROGRESSIVE AWARD LEVELS

PRIORITY CLAIM

This application is a continuation application of, claims priority to and the benefit of U.S. patent application Ser. No. 13/101,554, filed on May 5, 2011, which is a continuation application of, claims priority to and the benefit of U.S. patent application Ser. No. 11/557,727, filed on Nov. 8, 2006, the entire contents of which are each incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Symbols or symbol combinations which are less likely to occur usually provide higher awards. In such known gaming machines which incorporate games of chance, each award or outcome is associated with a contribution which is based on the value of the award or outcome and the probability of that award or outcome being generated. In these gaming devices, an average expected payout is determined based on a summation of the contributions of each of the available awards or outcomes.

In such known gaming machines, the amount of the wager made on the base game by the player may vary. For instance, the gaming machine may enable the player to wager a minimum number of credits, such as one credit (e.g., one penny, nickel, dime, quarter or dollar) up to a maximum number of credits, such as five credits. This wager may be made by the player a single time or multiple times in a single play of the primary game. For instance, a slot game may have one or more paylines and the slot game may enable the player to make a wager on each payline in a single play of the primary game. Thus, it is known that a gaming machine, such as a slot game, may enable players to make wagers of substantially different amounts on each play of the primary or base game ranging, for example, from 1 credit up to 125 credits (e.g., 5 credits on each of 25 separate paylines). This is also true for other wagering games, such as video draw poker, where players can wager one or more credits on each hand and where multiple hands can be played simultaneously. Accordingly, it should be appreciated that different players play at substantially different wagering amounts or levels and at substantially different rates of play.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. Part of the enjoyment and excitement of playing certain gaming machines is the occurrence or triggering of the secondary or bonus game (even before the player knows how much the bonus award will be). In other words, obtaining a bonus event and a bonus award in the bonus event is part of the enjoyment and excitement for players.

Gaming devices involving games of skill are also known. Such games of skill are popular among players because certain players feel a competitive edge while playing. That is, these players enjoy the feeling that a personal strength could lead to them winning one or more awards at the gaming device. However, because these gaming devices incorporate one or more elements of skill as a factor of determining to provide any awards to the player, these gaming devices are often not approved by gaming regulators or not as popular with lesser skilled players who feel severely disadvantaged. Moreover, in these gaming devices, the probability of each award or outcome being generated is based on one or more aspects of player skill (which varies from player to player) and is thus unknown. Accordingly, the average expected payout for such gaming devices often cannot be exactly determined but only determined within a range.

Progressive awards associated with gaming machines are also known. In one form, a progressive award is an award amount which includes an initial amount funded by a casino and an additional amount funded through a portion of each wager made on the progressive gaming machine. For example, 0.1% of each wager placed on the primary game of the gaming machine associated with the progressive award may be allocated to the progressive award or progressive award fund or pool. The progressive award grows in value as more players play the gaming machines and more portions of these players' wagers are allocated to the progressive award. When a triggering event occurs, such as a player obtains a winning symbol or symbol combination associated with the progressive award or the accumulated progressive award increments to a progressive award hit value, the accumulated progressive award is provided to the player. After the progressive award is provided to the player, the amount of the next progressive award is reset to the initial value and a portion of each subsequent wager on a gaming machine associated with a progressive award is allocated to the next progressive award.

A progressive award may be associated with or otherwise dedicated to a single or stand-alone gaming machine. Alternatively, a progressive award may be associated with or otherwise dedicated to multiple gaming machines which each contribute a portion of wagers placed at such gaming machine (s) to the progressive award. The multiple gaming machines may be in the same bank of gaming machines, in the same casino or gaming establishment (usually through a local area network ("LAN")) or in two or more different casinos or gaming establishments (usually through a wide area network ("WAN")). Such progressive awards are played for by one or more gaming devices in the same gaming establishment sometimes called local area progressives ("LAP") and such progressive awards played for by a plurality of gaming devices at a plurality of different gaming establishments are sometimes called wide area progressives ("WAP").

Moreover it is known that a gaming machine or bank of gaming machines may be simultaneously associated with a plurality of progressive awards. In these multi-level progressive ("MLP") configurations, a plurality of progressive awards are arranged in a hierarchy and can start at different award or value levels, such as $10, $100, $1000 and $10,000. Each progressive award individually increments or increases until a suitable triggering event at one of more of the gaming devices associated with the MLP causes one or more of the progressive awards to be provided to one or more of the players. In these known gaming systems, once a player is selected to be provided one or more of the progressive awards of the MLP, the gaming system either selects one of the progressive awards to be awarded to the player or enables the player to participate in an event to determine which progressive award they will be provided.

One known problem with these MLP type progressive awards is that there is often a lack of player interaction in which the player feels as though their strategic choices affect which progressive award will be provided. For example, although known gaming devices incorporate a selection game to determine which of the plurality of progressive awards of an MLP the player will receive, such determination does not include any skill or strategy on the part of the player, just luck. Accordingly, many of the players who win these MLP type games are chosen based on a specific non-skill based event. It should be appreciated that although these players are excited about winning a progressive award, such players are often left wondering how it happened or why they provided the progressive award they received.

Another problem among players in an MLP configuration is that the lower progressive awards can be higher valued than mid-ranged (or higher-ranged) progressive awards if the mid-ranged (or higher-ranged) progressive award was recently hit and reset to an initial value. For example, if an MLP configuration has progressive awards valued at $10, $20, $50, and $100 at a first point in time and a player is provided the third level progressive award valued at $50 (which subsequently resets to an initial value, such as $20), then the progressive awards at a second, subsequent point in time are $15, $30, $20, and $130. Thus, any player who would subsequently win the third level progressive award would be discouraged by the fact that the at least one lower level progressive award currently has a higher value. Such a configuration further presents the unintended consequences of players often becoming discouraged by winning higher award levels of the MLP. Accordingly, one or more players may not play their best (or may intentionally play poorly) in hopes of winning the higher valued, lower leveled progressive award.

Accordingly, there is a continuing need to provide new and different gaming devices and gaming systems as well as new and different ways to provide awards to players including progressive awards.

There is also a continuing need to provide new and different gaming devices and gaming systems which incorporate one or more elements of skill in determining which of a plurality of progressive awards are provided to players.

SUMMARY

In one embodiment, the gaming system disclosed herein includes a plurality of progressive awards or progressive incremented values in a multiple-level progressive award ("MLP") configuration. In one embodiment, in a suitably triggered bonus event, a player begins at the lowest or bottom progressive award level of the MLP (which they are assured of winning if they do not reach any other progressive award levels) and attempts to reach a higher progressive award level based on their actions/decisions in the bonus event. In one such embodiment, if as a result of their play in the bonus event, a player is provided a progressive award other than the lowest level progressive award, one or more of the remaining lower level progressive awards (i.e., a progressive award which is associated with a lower level of the MLP than the provided progressive award) are shifted, advanced or reassociated to account for the provided progressive award. In this embodiment, the lowest level progressive award (which is temporality left vacant by the shifting of the remaining progressive awards) is changed or reset to a set value. For example, if an MLP configuration includes four progressive award levels and the progressive award associated with the third progressive award level is provided to a player in a triggered bonus event, then the progressive award associated with the second progressive award level is shifted to the third progressive award level (which was vacant from being provided to the player), the progressive award associated with the first or lowest progressive award level is shifted to the second progressive award level (which was vacant from the previously described shift) and a set value funds the first progressive award level. It should be appreciated that this configuration provides that the progressive award hierarchy is always preserved regardless of which progressive award of which progressive award level is provided to the player in the bonus event. That is, such a configuration provides that a lower level progressive award of an MLP will not have a higher value than a mid-level or an upper-level progressive award even if the mid-level or upper-level progressive award was recently provided to a player.

In one embodiment, the triggered bonus event includes one or more aspects of player skill in determining which progressive award of the MLP to provide to the player. In this embodiment, to account for the differences in how each player may play in the triggered bonus event (i.e., optimal bonus event play or poor bonus event play), the gaming system utilizes the set value to fund the lowest level progressive award for each play or triggering of the bonus event. This embodiment provides that regardless of how a player may play the bonus event and which progressive award is provided to the player, the gaming system contributes the same, set value to the bonus event each time the bonus event is triggered. In this embodiment, by enabling each play or triggering of the bonus event to be funded by the same set value, the gaming system disclosed herein is operable to introduce a level of player skill into the bonus event without compromising the bonus event outcomes or awarding experienced players by punishing inexperienced players. In other words, by shifting the progressive awards such that the bottom progressive award level is funded with a set value each time the bonus event is triggered (i.e., the bonus event costs the gaming system the same amount each time the bonus event is triggered), any unknown game play elements associated with the introduction of player skill are thus eliminated. Such a configuration provides that a degree of skill can be introduced in the bonus event because no matter how the player plays or which of the progressive awards of the MLP is actually provided to the player in the bonus event, the gaming system only needs to account for and fund the set value associated with the bottom progressive award. This configuration further provides that players will play their best (and not intentionally play poorly) to maximize their progressive award in hopes of winning a higher valued, higher leveled progressive award.

In one embodiment, the gaming system disclosed herein includes a central server, central controller or remote host in communication with or linked to a plurality of gaming machines or gaming devices. In one such embodiment, the central server maintains a plurality of progressive awards in an MLP configuration. In one embodiment, one or more of the progressive awards of the MLP start at the same value and increment or increase until provided to a player. In another embodiment, one or more of the progressive awards of the MLP start at different values and increment or increase until provided to a player. In different embodiments, one or more of the progressive awards of the MLP increment or increase at the same rate or at different rates.

In one embodiment, upon a suitable triggering event, one of the gaming devices in the gaming system is selected to provide a bonus event, such as a bonus or secondary game or a bonus or secondary sequence. In one embodiment, the triggering of the bonus event occurs through a game play event, such as the generation of a designated symbol or symbol combination or any other suitable symbol-driven trigger, at an individual gaming device in the gaming system. In another embodiment, the triggering of the bonus event occurs independent of any game play event which may occur in any primary game or any secondary game played at one or more of the gaming devices in the gaming system. In different embodiments, the triggering of the bonus event is determined to occur by a remote server based on time, an event occurring at the gaming device, an accumulation of occurred events or any other suitable manner.

In one embodiment, the bonus event incorporates one or more aspects of player skill to determine which one of the progressive awards will be provided to the player. In this embodiment, the player begins at the lowest or bottom progressive award level of the MLP and attempts to reach a higher progressive award level, based at least in part on their level of skill, knowledge or strategy in the bonus event.

In one example embodiment, the selected gaming device in the gaming system provides a multi-level secondary game, wherein each level or round of the secondary game corresponds to one of the levels of the MLP. In this embodiment, beginning at the lowest level or round, the gaming device provides and displays to the player a plurality of selections. Each of the selections, along with a displayed initial base element, include a plurality of characteristics. For example, the selections are a plurality of playing cards, wherein one characteristic associated with each playing card is a color and another characteristic associated with each playing card is a number.

In operation, the player picks at least one of the provided selections, if any, that has at least one characteristic that matches (i.e., that is the same as, equal to or equivalent to) one of the characteristics of the base element. If the player picks a selection that has at least one characteristic that matches one of the characteristics of the base element, the picked selection replaces the previous base element. In this embodiment, if a picked selection replaces a base element, that picked selection cannot be subsequently picked by the player during that round of the secondary game. After replacing the previous base element with the player picked selection, the gaming device proceeds as described above by enabling the player to pick at least one of any remaining provided selections that has at least one characteristic that matches one of the characteristics of the new base element.

For example, if the initial base element is associated with one characteristic which is the color green and another characteristic which is the number nine, and the player picked a selection associated with the characteristics of the color green and the number seven, then since the color green characteristics match between the base element and the player picked selection, the player picked selection is designated as the new base element and the gaming device enables the player to pick another selection. It should be appreciated that since the gaming device displays the characteristics associated with each of the provided selections at the onset of the secondary game and the player decides the order in which to pick the provided selections, this secondary game involves a degree of skill or strategy.

If the player is unable to pick a selection that has at least one characteristic that matches at least one characteristic of the base element, the gaming device terminates the secondary game and provides the player the progressive award associated with the progressive award level which corresponds to the player's current level in the secondary game. For example, if upon triggering the secondary game, the player is unable to pick any selections that have at least one characteristic that matches one of the characteristics of the initial base element, the gaming device terminates the secondary game and provides the player the progressive award associated with the bottom or lowest level of the MLP (which corresponds with the beginning lowest level of the secondary game). It should be appreciated that in this embodiment, since the player begins the secondary game at a level which corresponds to the bottom or lowest level of the MLP, the player will always win one of the progressive awards of the MLP (i.e., regardless of how poorly the player plays the secondary game).

If after picking and matching one or more selections, no selections remain available to be picked for the current level or round of the secondary game (i.e., the player has matched all of the provided selections for the current secondary game level) and there is at least one higher level of the secondary game than the player's current level, the gaming device advances the player to the next higher level of the secondary game (which corresponds to the next higher progressive award level of the MLP). In the next level of the secondary game, the gaming device provides another plurality of selections and proceeds as described above. On the other hand, if no selections remain available to be picked for the current level of the secondary game and there are no higher levels of the secondary game than the player's current level (i.e., the player is at the top level of the secondary game), the selected gaming device of the gaming system provides the player the top progressive award of the MLP (which corresponds to top level of the secondary game) and terminates the secondary game.

In one embodiment, as mentioned above, if the player is provided a progressive award other than the lowest level progressive award, one or more of the progressive awards (which are associated with levels of the MLP which are lower than the level of the provided progressive award) are shifted, advanced or otherwise reassociated to account for the provided progressive award. That is, to preserve the progressive award hierarchy of the MLP (i.e., each progressive award level of the MLP is associated with a higher valued progressive award than any lower progressive award levels), the gaming system disclosed herein causes one or more progressive awards associated with one or more progressive award levels of the MLP to shift progressive award levels. In this embodiment, the lowest level of the MLP (which is temporality left vacant by the shifting of the progressive awards) is set or funded to an initial or set value.

For example, an MLP configuration includes three progressive award levels with three progressive awards valued at $5.65, $7.19 and $11.12. In this example, the player advanced to the second level of the secondary game before the secondary game terminated and thus the gaming device provided the second progressive award associated with the second progressive award level to the player. After the player is provided the second progressive award associated with the second progressive award level of the MLP, the three progressive award levels of the MLP include progressive awards valued at $5.65, $0.00 and $11.12. The gaming system disclosed herein shifts the progressive award associated with the first or lowest progressive award level to the vacant middle progressive award level and funds the progressive award associated with the lowest progressive award level with the initial or set value of $5.00. Accordingly, the three progressive award levels of the gaming system disclosed herein would include progressive awards valued at $5.00, $5.65 and $11.12 and thus the hierarchy of the MLP configuration is preserved.

It should be appreciated that introducing an element of player skill or strategy into the bonus event presents a mathematical challenge in determining how much money to allot for the bonus event, as skillful or strategic play may cost one amount and less skillful or strategic play may cost another amount. In one embodiment, to account for the differences in how skillfully or strategically each player may play the award attempt, the central controller and/or gaming device processor associates the set value with each triggered bonus event. That is, by associating and distributing the set value as the progressive award associated with the lowest level of the MLP with each and every triggered bonus event, the gaming system combats the uncertainty of player behavior (i.e., how each player performs) during each bonus event. This removes any uncertainty by accounting for player skill and strategy in funding the bonus event, thus guaranteeing the average payback percentage for each triggered bonus event (i.e., holding the bonus event payout percentage constant), and solving the other mathematical considerations by creating a uniform cost for each triggered bonus event.

In other words, by shifting the progressive awards and setting the lowest level progressive award to the set or initial value for each play of the bonus game, the gaming system disclosed herein accounts for the differences in how each player may play the bonus event (i.e., introduces a level of player skill into the bonus event) without compromising the game outcome payout or awarding experienced players by punishing inexperienced players. That is, since the gaming system only needs to account for and fund the set value associated with the bottom progressive award for each triggering of the bonus event, the cost incurred by the gaming system for triggering the bonus event is set regardless of how the player plays the bonus event and regardless of which of the progressive awards is provided to the player.

Accordingly, the gaming system disclosed herein provides new and different gaming devices which are operable to maintain the hierarchy of a multi-level progressive award configuration regardless of which progressive award of which progressive award level is provided to the player.

The gaming system disclosed herein also provides new and different gaming devices that include a bonus event wherein which progressive award is provided is based, at least in part, on a level of player skill.

Additional features and advantages are described in, and will be apparent from, the following Detailed Description and the figures.

BRIEF DESCRIPTION OF THE FIGURES

FIGS. 5A and 5B are tables illustrating one example of the different progressive awards associated with the MLP before and after a triggering of the bonus event.

DETAILED DESCRIPTION

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
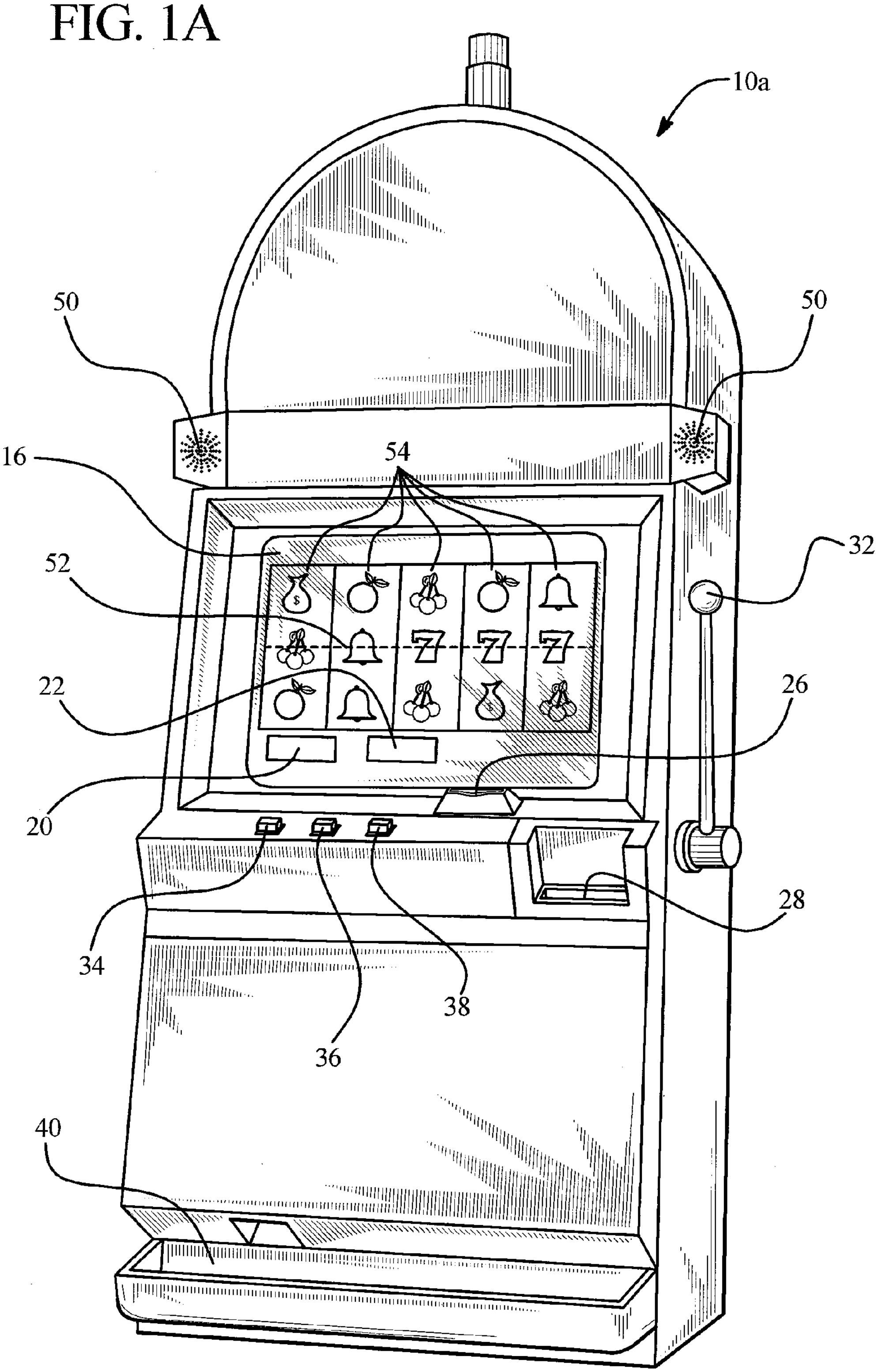
FIGS. 1A and 1B are front perspective views of alternative embodiments of gaming devices disclosed herein.
Figure 1B:
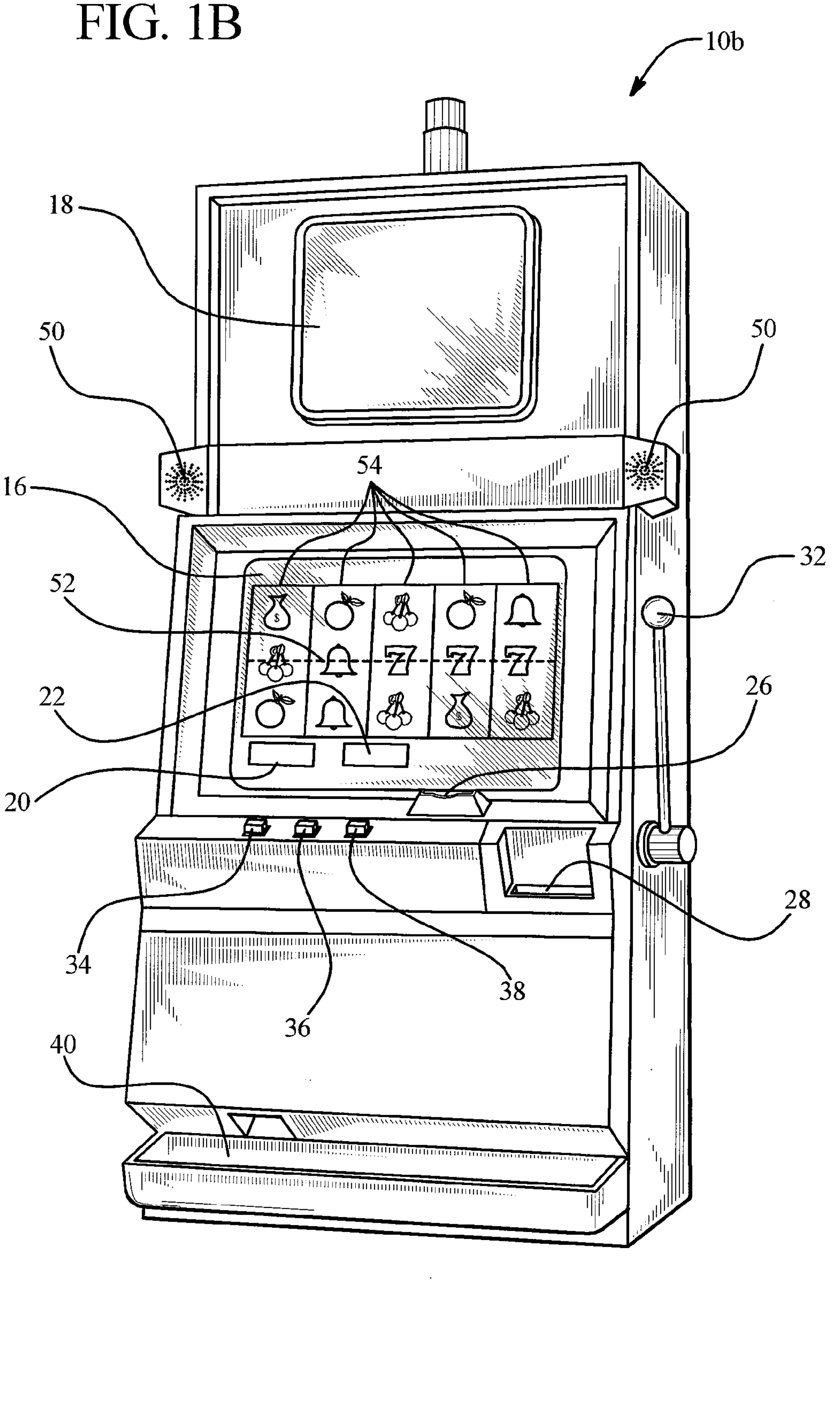

Referring now to the drawings, two example alternative embodiments of the gaming device of the disclosed herein are illustrated in FIGS. 1A and 1B as gaming device 10*a* and gaming device 10b, respectively. Gaming device 10a and/or gaming device 10b are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
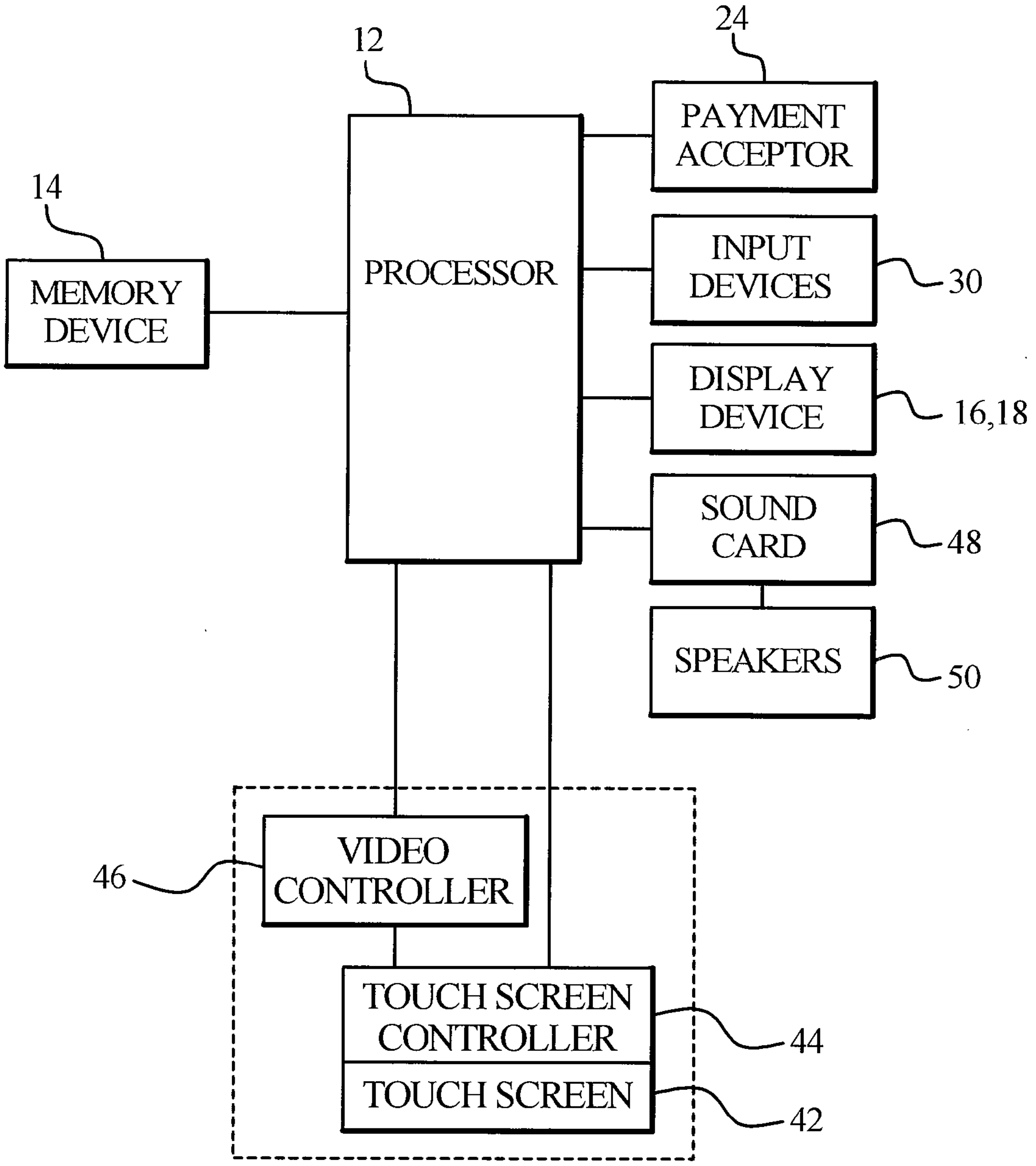
FIG. 2A is a schematic block diagram of the electronic configuration of one embodiment of a gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. As seen in FIGS. 1A and 1B, in one embodiment, the gaming device includes a credit display 20 which displays a player's current number of credits, cash, account balance or the equivalent. In one embodiment, gaming device includes a bet display 22 which displays a player's amount wagered.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier (or other suitable redemption system) or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a touch-screen button panel. It should be appreciated that the utilization of touch-screens is widespread in the gaming industry.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Figure 2B:
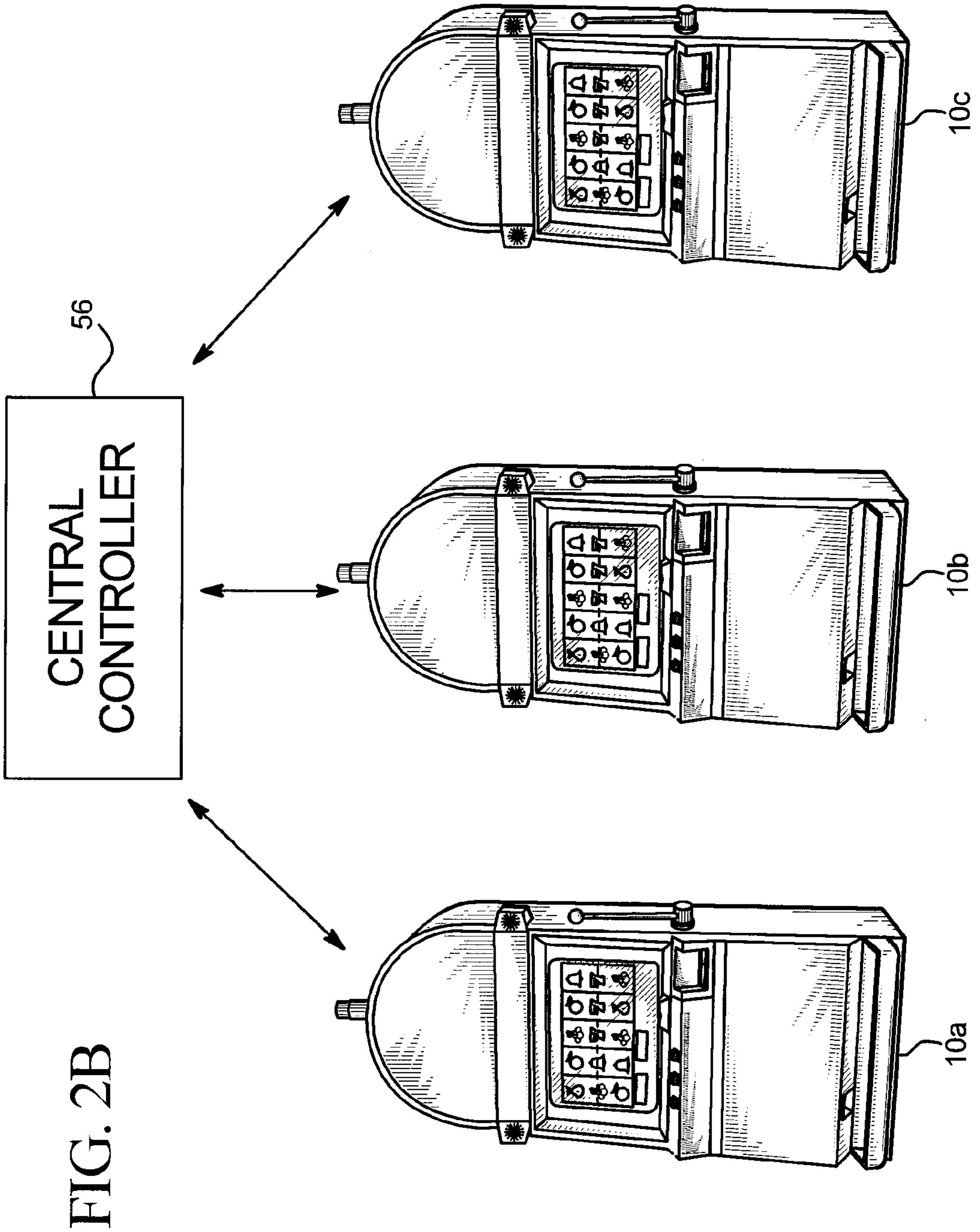
FIG. 2B is a schematic diagram of the central server in communication with a plurality of gaming machines in accordance with one embodiment of the gaming system disclosed herein.

In one embodiment, as illustrated in FIG. 2B, one or more of the gaming devices 10 are in communication with each other and/or at least one central server, central controller or remote host 56 through a data network or remote communication link. These gaming devices and the central server form the gaming system disclosed herein. In this embodiment, the central server, central controller or remote host is any suitable server or computing device which includes at least one processor and at least one memory or storage device. The number of gaming machines in the gaming system can vary as desired by the implementer of the gaming system. These gaming machines are referred to herein alternatively as the group of gaming machines, the linked gaming machines or the system gaming machines. The linked gaming machines may be of the same type or of different types of gaming machines. The linked gaming machines may have the same primary game or two or more different primary games. For example, one gaming machine may be adapted to play a slot game while another gaming machine may be adapted to play a poker game. The linked gaming machines may have no secondary games, one or more secondary games, the same secondary games or two or more different secondary games. The terms central server, central controller and remote host are used interchangeably herein.

In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, a plurality of the gaming devices are capable of being connected together through a data network. In one embodiment, the data network is a local area network (LAN), in which one or more of the gaming devices are substantially proximate to each other and an on-site central server as in, for example, a gaming establishment or a portion of a gaming establishment. In another embodiment, the data network is a wide area network (WAN) in which one or more of the gaming devices are in communication with at least one off-site central server. In this embodiment, the plurality of gaming devices may be located in a different part of the gaming establishment or within a different gaming establishment than the off-site central server. Thus, the WAN may include an off-site central server and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type, in another embodiment, if the reels 54 are in video form, one or more of the display devices, as described above, display the plurality of simulated video reels 54. Each reel 54 displays a plurality of indicia such as bells, hearts, fruits, numbers, letters, bars or other images which preferably correspond to a theme associated with the gaming device. In this embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the players wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the gaming machines of the gaming system are operable to enable multiple players at the multiple linked gaming machines to participate in multiple bonus events at the same time or substantially the same time. Alternatively, the gaming machines of the gaming system are operable to enable multiple players at the multiple linked gaming machines to participate in multiple bonus events in an overlapping or sequential manner.

In one embodiment, the triggering event or qualifying condition for the bonus or secondary game may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition for the bonus or secondary game may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

In one embodiment, the game outcome provided to the player is determined by a central server and provided to the player at the gaming device. In this embodiment, each of a plurality of such gaming devices are in communication with the central server. Upon a player initiating game play at one of the gaming devices, the initiated gaming device communicates a game outcome request to the central server.

In one embodiment, the central server receives the game outcome request and randomly generates a game outcome for the primary game based on probability data. In another embodiment, the central server randomly generates a game outcome for the secondary game based on probability data. In another embodiment, the central server randomly generates a game outcome for both the primary game and the secondary game based on probability data. In this embodiment, the central server is capable of storing and utilizing program code or other data similar to the processor and memory device of the gaming device.

In an alternative embodiment, the central server maintains one or more predetermined pools or sets of predetermined game outcomes. In this embodiment, the central server receives the game outcome request and independently selects a predetermined game outcome from a set or pool of game outcomes. The central server flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment insures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental or intermittent award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming devices provided bingo card wins or does not win the bingo game as described above.

In another embodiment, one or more of the gaming devices are in communication with a central server for monitoring purposes only. That is, each individual gaming device randomly generates the game outcomes to be provided to the player and the central server monitors the activities and events occurring on the plurality of gaming devices. In one embodiment, the gaming network includes a real-time or on-line accounting and gaming information system operably coupled to the central server. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. In this embodiment, the gaming device and/or player tracking system tracks any players gaming activity at the gaming device. In one such embodiment, the gaming device and/or associated player tracking system timely tracks when a player inserts their playing tracking card to begin a gaming session and also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

As mentioned above, in one embodiment, the present disclosure may be employed in a server based gaming system. In one such embodiment, as described above, one or more gaming devices are in communication with a central server. The central server may be any suitable server or computing device which includes at least one processor and at least one memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

Progressive Awards

Figure 3:
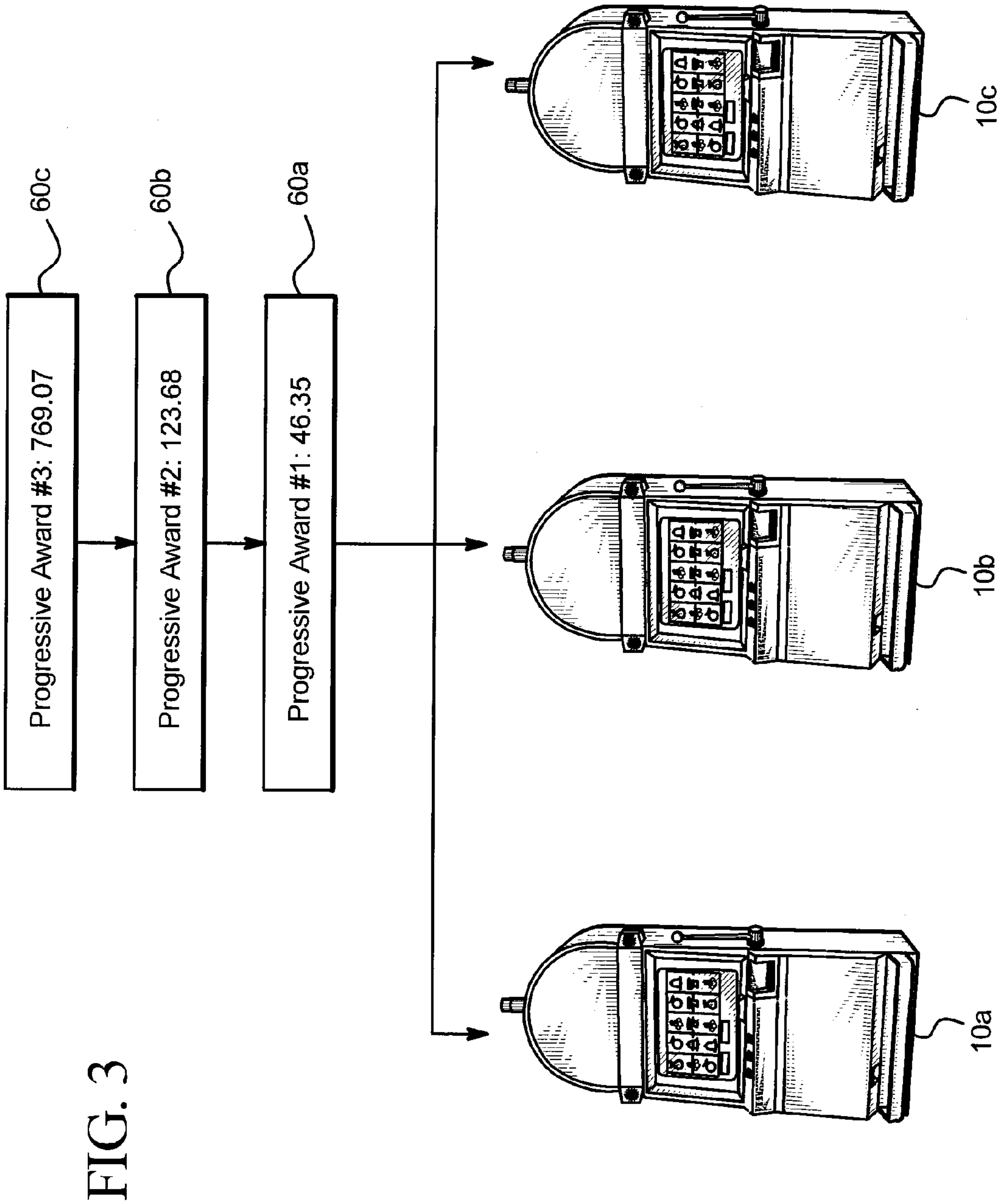
FIG. 3 is a schematic diagram of the plurality of gaming devices in the gaming system and the plurality of progressive awards maintained by the gaming system.

In one embodiment, the gaming system disclosed herein includes a plurality of progressive awards or progressive incremented values in an MLP configuration. In this embodiment, a plurality of gaming devices at one or more gaming sites are networked to the central server in an MLP configuration, wherein a portion of each wager placed is allocated to one or more progressive awards or progressive incremented values. For example, as illustrated in FIG. 3, the gaming system maintains a first progressive award associated with a first progressive award level 60*a* (valued at 46.35 credits at a first point in time), a second progressive award associated with a second progressive award level 60*b* (valued at 123.68 credits at a first point in time) and a third progressive award associated with a third progressive award level 60*c* (valued at 769.07 credits at a first point in time) in a multi-level progressive award configuration. It should be appreciated that any suitable number of progressive awards and any suitable number of progressive award levels may be implemented with the gaming system disclosed herein.

In one embodiment, different progressive awards are associated with different numbers of gaming devices. For example, a first progressive award of the MLP which is valued at $10,000 may be associated with ten gaming devices while a second progressive award of the MLP which is valued at $500,000 may be associated with one-hundred gaming devices. In one embodiment, the multiple gaming machines may be in the same bank of machines, in the same casino or gaming establishment (such as through LAN), or in two or more different casinos or gaming establishments (such as through a WAN).

In another embodiment, each individual gaming machine maintains a plurality of progressive awards in an MLP configuration wherein a portion of the wagers placed at that respective gaming machine is allocated to one or more of the progressive awards maintained by such individual gaming machine. In one embodiment, a portion of each wager placed at a designated gaming device is allocated to one or more progressive awards of the MLP associated with that designated gaming device. In another embodiment, a portion of designated wagers placed at a designated gaming device, such as a portion of each maximum wager placed or a portion of each side wager placed, is allocated to one or more progressive awards of the MLP associated with that designated gaming device. It should be appreciated that in these embodiments, the functions of the gaming system providing a progressive award in a triggered bonus event as disclosed herein are provided on the single or stand-alone gaming device.

In another embodiment, each individual gaming machine maintains one or more progressive awards of the MLP configuration and the central server simultaneously or substantially simultaneously maintains one or more progressive awards of the MLP configuration. In one such embodiment, the lower valued, more frequently triggered progressive awards of the MLP are maintained by the individual gaming machines and the higher valued, less frequently triggered progressive awards of the MLP are maintained by the central server.

In one embodiment, a master host site computer is in communication with or coupled to a plurality of the central servers at a variety of mutually remote gaming sites for providing a multi-site linked progressive automated gaming system. In one embodiment, a master host site computer may serve gaming devices distributed throughout a number of properties at different geographical locations including, for example, different locations within a city or different cities within a state. In one embodiment, the master host site computer is maintained for the overall operation and control of the system. In this embodiment, a master host site computer oversees all or part of the progressive gaming system and is the master for computing all or part of the progressive jackpots. All participating gaming sites report to, and receive information from, the master host site computer. Each central server computer is responsible for all data communication between the gaming device hardware and software and the master host site computer.

In one embodiment, one or more of the progressive awards start at the same value and increment or increase until provided to a player. In another embodiment, one or more of the progressive awards start at different values and increment or increase until provided to a player. For example, the progressive award associated with the highest progressive award level of the MLP starts at the highest value and the progressive award associated with the lowest progressive award level of the MLP starts at the lowest value.

In these embodiments, the progressive awards accumulate based on a small percentage (such as 0.1%) of coin-in or wagered amounts in a conventional manner. In one such embodiment, different progressive awards associated with different levels of the MLP increment at different rates. For example, the progressive award associated with the highest progressive award level of the MLP increments at the highest rate and the progressive award associated with the lowest progressive award level of the MLP increments at the lowest rate. Such different starting values coupled with different increment rates provides that even if a progressive award triggering event occurs infrequently, the gaming system disclosed herein maintains the hierarchy of the plurality of progressive awards of the MLP.

In one embodiment, different percentages of coin-in or wagered amounts fund different progressive awards of the MLP. For example, 0.1% of coin-in funds the first level progressive award of the MLP, 0.15% of coin-in funds the second level progressive award of the MLP, and 0.2% of coin-in funds the third level progressive award of the MLP. In another embodiment, the percentage that goes to each progressive award is equal (such as 0.1% to each of the three progressive award levels of the MLP).

In one embodiment, the percentage of each wagered amount that funds one or more progressive awards is equal for each wagered amount. In another embodiment, the percentages of wagered amounts that fund one or more progressive awards are different for different wager amounts. For example, a wager of one to twenty-five credits may increment a progressive award 0.1% of the wager, a wager of twenty-six to fifty credits may increment a progressive award 0.08% of the wager and a wager of fifty-one to seventy-five credits may increment a progressive award 0.07% of the wager. In another embodiment, as described in more detail below, at least a fraction of one or more of the progressive awards of the MLP are funded by the gaming establishment, such as a casino, by using a starting value higher than zero to make the progressive awards attractive even after they are reset.

In one embodiment, the central server and/or individual gaming device processor increases the progressive awards associated with the progressive award levels of the MLP until a progressive award is provided to a player (upon the occurrence of a suitable triggering event). In one embodiment, two or more of the progressive awards of the MLP are funded at different temporal rates. In this embodiment, the different progressive awards are incremented or funded in different increments of time wherein until the progressive award hits, a set amount is added to the progressive award at each determined time increment. In another embodiment, two or more of the progressive awards may each be incremented or funded based on different incrementing factors or incrementors. In this embodiment, a first of the progressive awards may increment each time a first incrementing factor occurs and a second of the progressive awards may increment each time a second incrementing factor occurs, wherein the first incrementing factor and the second incrementing factor are different. Examples of incrementing factors could be a symbol-driven trigger in the base game, the occurrence of one or more events in a bonus game, the player betting a maximum amount, a percentage of possible gaming machines being actively played or in active status, or any other suitable method for defining an incrementor.

In one embodiment, different gaming devices in the gaming system have different progressive awards of the MLP available to the player. In one such embodiment, different types of gaming devices are associated with different types of progressive awards of the MLP based on the current configuration of the gaming system. In one embodiment, zero, one or more progressive awards of the MLP may be associated with each of the gaming devices in the gaming system while zero, one or more different progressive awards of the MLP may be associated with a plurality of, but not all of the gaming devices in the gaming system.

In one embodiment, one or more of the progressive awards of the MLP are each funded via a side bet or side wager. In this embodiment, a player must place or wager a side bet to be eligible to win the progressive award associated with the side bet. In one embodiment, the player must place the maximum bet and the side bet to be eligible to win one of the progressive awards of the MLP. In another embodiment, if the player places or wagers the required side bet, the player may wager at any credit amount on any payline (i.e., the player need not place the maximum bet and the side bet to be eligible to win one of the progressive awards). In one such embodiment, the greater the player's wager (in addition to the placed side bet), the greater the odds or probability that the player will win one of the progressive awards of the MLP. It should be appreciated that one or more of the progressive awards of the MLP may each be funded, at least in part, based on the wagers placed on the primary games of the gaming machines in the gaming system, via a gaming establishment or via any suitable manner. In one such embodiment, one or more progressive awards of the MLP are funded, at least partially, via an amount provided by one or more marketing and/or advertising departments, such as a casino's marketing department.

In another embodiment, one or more of the progressive awards of the MLP are partially funded via a side-bet or side-wager which the player may make (and which may be tracked via a side-bet meter). In one embodiment, one or more of the progressive awards of the MLP are funded based on player's wagers as described above as well as any side-bets or side-wagers placed.

In one alternative embodiment, a minimum wager level is required for a gaming machine to qualify to be selected to obtain one of the progressive awards of the MLP. In one embodiment, this minimum wager level is the maximum wager level for the primary game in the gaming machine. In another embodiment, this minimum wager level is placing a wager on all available paylines in a slot primary game or alternatively placing a wager on all available poker hands in a multi-hand poker primary game. In another embodiment, no minimum wager level is required for a gaming machine to qualify to be selected to obtain one of the progressive awards of the MLP.

Triggered Bonus Event

Figure 4:
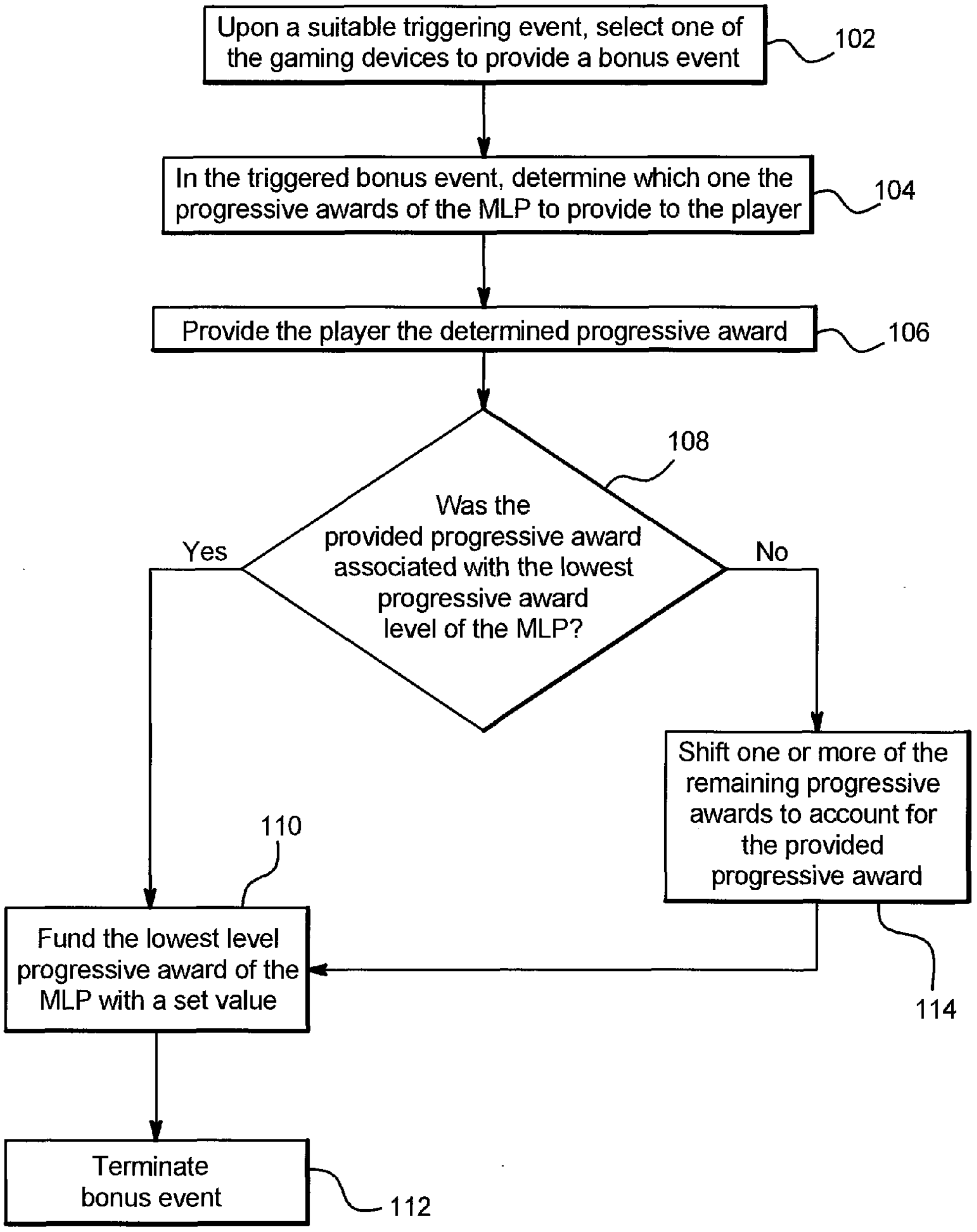
FIG. 4 is a flowchart of one embodiment of the gaming system disclosed herein illustrating a player winning one of the progressive awards of the MLP.

In one embodiment, upon a suitable triggering event, one of the gaming devices in the gaming system is selected to provide a bonus event as indicated in block 102 of FIG. 4. In one such embodiment, the bonus event is triggered based on one or more game play events, such as a symbol-driven trigger. In other embodiments, the bonus event is triggered based on exceeding a certain amount of game play (such as number of games, number of credits, or amount of time), or reaching a specified number of points earned during game play.

In another such embodiment, a bonus event is randomly triggered or apparently randomly triggered. In one such embodiment, the gaming device does not provide any apparent reasons to the player for triggering the bonus event, wherein triggering the bonus event is not based on any event in any of the plays of any primary games or on any of the plays of any secondary game of the gaming machines in the gaming system. That is, a bonus event is triggered without any explanation or alternatively with simple explanations. In another embodiment, a bonus event is triggered at least partially based on a game event, such as a symbol-driven trigger, and at least partially based on a non-game play, random event.

In one such embodiment, the triggering of the bonus event is randomly determined, wherein different players are assigned different chances of participating in the bonus event based on their respective wager levels. For example, if a first player wagered 500 coins and a second player wagered 225 coins and the chance of participating in the bonus event was 1/20,000, the first player would have a 2.5% (500/20,000) chance of participating in the bonus event while the second player would have a 1.125% (225/20,000) chance of participating in the bonus event.

In one such embodiment, the triggering of the bonus event occurs based on at least one accumulated value progressive award incremented to a progressive award hit value. In this embodiment, the gaming system includes one or more accumulated value progressive awards or Nth coin progressive awards. Such accumulated value progressive awards are driven by an amount of wagers placed or a suitable coin-in amount. In one such embodiment, each accumulated value progressive award is associated with a range of values, wherein a bonus event will trigger when the progressive award increments to a progressive award hit value within the range of values associated with that progressive award. That is, when an accumulated value progressive award increases to a determined progressive award hit value, a triggering of the bonus event will occur. In different embodiments, the progressive award hit value at which an accumulated value progressive award causes a triggering of the bonus event to occur is predetermined, randomly determined, determined based on the wagers placed in the gaming system, determined based on the status of one or more players (such as determined through a player tracking system), determined based on time, or determined based on any other suitable method. In this embodiment, after the accumulated value progressive award causes a triggering of the bonus event to occur, the accumulated value progressive award is reset to a default value and starts incrementing from the default progressive award level.

In operation of one such embodiment, the central server which hosts one of these accumulated value progressive awards: (1) determines a minimum amount and a maximum amount for the progressive award or prize pool, (2) provides that the progressive award or prize pool starts at the minimum, (3) determines an accumulated value progressive award hit value between the minimum amount and the maximum amount, (4) increments the progressive award or prize pool with a configured percent of coin-in, and (5) causes a triggering of the bonus event to occur when the progressive award or prize pool equals the determined accumulated value progressive award hit value. In this embodiment, the accumulated value progressive award hit value is determined at random to maintain fairness for the players at the gaming devices in the gaming system, wherein the players are not aware of any determined accumulated value progressive award hit value.

In different embodiments, the range of values associated with an accumulated value progressive award is predetermined, randomly determined, determined based on the wagers placed in the gaming system, determined based on the status of one or more players (such as determined through a player tracking system), determined based on time, or determined based on any other suitable method. In one embodiment, a plurality of accumulated value progressive awards are associated with different value ranges. In another embodiment, each of a plurality of accumulated value progressive awards are associated with a different value range. In another embodiment, a plurality of accumulated value progressive awards are associated with the same value range. In another embodiment, the value range associated with an accumulated value progressive award is based on a player's status (via a player tracking system).

In another such embodiment, the triggering of the bonus event is based on time. In this embodiment, a time is set for when a bonus event trigger will occur. In one embodiment, such a set time is based on historic data. For example, if previous bonus event triggers have occurred after approximately sixty-seven hours, a bonus event may be set to trigger sixty-seven hours from the conclusion of the previous bonus event. In one embodiment, a suitable algorithm is implemented to determine the player who wagered at or closest to this time with tie-breaking based on any number of factors (e.g., player tracking history, amount of or recent wagers placed). In this embodiment, the gaming device which the algorithm determined wagered closest to when the bonus event triggered is enabled to participate in the triggered bonus event. In another embodiment, one of the gaming devices which placed a wager during a designated time period is randomly selected and enabled to participate in the triggered bonus event.

In another such embodiment, the triggering of the bonus event is based on a predefined variable reaching a defined parameter threshold. For example, the bonus event is triggered when the 500th different player has played a gaming machine associated with one of the progressive awards (ascertained from a player tracking system). In different embodiments, the predefined parameter thresholds include a length of time, a length of time after a certain dollar amount is hit, a wager level threshold for a specific machine (which gaming device is the first to contribute $250,000), a number of gaming machines active, or any other parameter that would define a threshold for triggering the bonus event.

In another such embodiment, the triggering of the bonus event occurs after a random number of plays in which a bonus event has not been triggered. In another embodiment, the triggering of the bonus event is based upon gaming system operator defined player eligibility parameters stored on a player tracking system (such as via a player tracking card or other suitable manner). In another embodiment, the triggering of the bonus event is based upon gaming system operator defined player eligibility parameters stored on a player tracking system (such as via a player tracking card or other suitable manner).

In another such embodiment, the triggering of the bonus event includes a system determination which is based on a random selection by the central controller. In one embodiment, the central controller tracks all active gaming machines and the wagers they placed. Each gaming machine has its own entry defining its state as either active or inactive and also defining the values of the wagers from that gaming machine. In one embodiment, active status means that the gaming machine is being actively played by a player and enrolled/inactive status means that the gaming machine is not being actively played by a player. The active status requirements can be based on any suitable number of satisfied criteria or defined in any suitable manner by the implementer of the gaming system. For instance, a play of or wager on the primary game of the gaming machine within a predetermined period of time may be part of the determination of whether that gaming machine is in the active status. Other factors such as: (a) the amount of time between each play of or wager on the primary game of the gaming machine; (b) the amount being wagered on the primary game(s); and (c) the number of plays within a period of time, may also or alternatively be part of the determination of whether a gaming machine is in the active status; (d) the existence of credits on the gaming device may also or alternatively be part of the determination of whether a gaming machine is in the active status. On the other hand, inactive status means that the gaming machine is one of the gaming machines in the gaming system, but is not in the active status (i.e., not being actively played by a player according to one or more of the predetermined criteria).

In one such embodiment, based on the gaming machine's state as well as one or more wager pools associated with the gaming machine, the central controller determines which of these gaming machines is enabled to participate in a triggered bonus event. In one embodiment, the gaming machine which has been classified as active the longest since the last triggering event is enabled to participate in a triggered bonus event. In another embodiment, the determination of which gaming device will play a bonus event is based on the relative proportion of gaming/wagering activity at each gaming device in the gaming system. In this embodiment, the player who consistently places a higher wager is more likely to participate in a bonus event than a player who consistently places a minimum wager.

In one alternative embodiment, a central controller and an individual gaming machine work in conjunction with each other to determine when to trigger each bonus event. In one embodiment, an individual gaming machine may determine when to trigger one or more bonus events. In another embodiment, an individual gaming machine may determine when to trigger at least one bonus event and the central controller determines when to trigger at least one bonus event.

In another embodiment, the central controller determines, in cooperation with the gaming device, when to trigger a bonus event by utilizing one or more random number generators. In this embodiment, the central controller determines when to trigger a bonus event by determining if any numbers allotted to a gaming device match a randomly selected number. In one such embodiment, upon or prior to each play of each gaming machine, a random number is selected from a range of numbers and during each primary game, the gaming machine allocates the first N numbers in the range, where N is the number of credits bet by the player in that primary game. At the end of the primary game, the randomly selected number is compared with the numbers allocated to the player and if a match occurs, that particular gaming machine triggers a bonus event. It should be appreciated that any suitable manner of triggering the bonus event may be implemented with the gaming system disclosed herein.

As mentioned above, in one embodiment, upon triggering the bonus event, one of the players at one of the gaming devices in the gaming system is selected to participate in the bonus event. In different embodiments, the player at one of the gaming devices selected to participate in the triggered bonus event is predetermined, randomly determined, determined based on a player's status (determined through a suitable player tracking system), determined based on a random determination by the central controller, determined based on a random determination at the gaming device, determined based on one or more side wagers placed, determined based on the player's primary game wager, determined based on time (such as the time of day) or determined based on any other suitable method or criteria.

In one embodiment, the triggered bonus event includes a bonus or secondary game or sequence. As indicated in blocks 104 and 106 of FIG. 4, in the triggered bonus event, the central controller and/or gaming device processor determines which one of the progressive awards of the MLP to provide to the player (as described in more detail below) and provides the player the determined progressive award. In one embodiment, in the triggered bonus event, one of the progressive awards of the MLP will be provided to the player and the bonus event is utilized to determine which one of these progressive awards to provide to the player. In another embodiment, in the triggered bonus event, one of the progressive awards of the MLP may or may not be provided to the player. In this embodiment, if no progressive award is provided to the player in the triggered bonus event, the set value is otherwise provided to the player in association with their play of the bonus event.

In one embodiment, the bonus event may include one or more of the game play features disclosed herein (or any other suitable game play feature otherwise known) which determine, at least in part, which one of the progressive awards of the MLP to provide to the player. In one embodiment, as described in more detail below, the bonus event incorporates one or more aspects of player skill to determine which one of the progressive awards will be provided to the player. In this embodiment, the player begins at the lowest or bottom progressive award level of the MLP and attempts to reach a higher progressive award level, based at least in part on their level of skill or strategy in the bonus event. In different embodiments, the bonus event may be any suitable type of single or multi-round game including, but not limited to, reel/slot games, card games (e.g., poker, blackjack), lottery games, selection games, offer and acceptance games, wheel games, dice games, free spin games, competition games and perceived skill games which determine, at least in part, which one of the progressive awards of the MLP to provide to the player.

In one embodiment, after providing one of the progressive awards to the player, the central controller and/or gaming device processor determines if the provided progressive award was associated with the lowest progressive award level of the MLP as indicated in diamond 108. If the provided progressive award was associated with the lowest level of the MLP, the gaming system funds the lowest level progressive award of the MLP with a set value or amount and terminates the bonus event as indicated in blocks 110 and 112.

In one embodiment, the set value or amount is the same for a plurality of the bonus events. In another embodiment, the set value or amount is the same for each bonus event. In one embodiment, the set value or amount is different for a plurality of the bonus events. In another embodiment, the set value is different for each bonus event. In different embodiments, the set value is predetermined, randomly determined, determined based on a player's status (determined through a suitable player tracking system), determined based on a random determination by the central controller, determined based on a random determination at the gaming device, determined based on one or more side wagers placed, determined based on the player's primary game wager, determined based on time (such as the time of day) or determined based on any other suitable method or criteria.

In one embodiment, if the provided progressive award was associated with a higher level of the MLP (i.e., a progressive award other than the lowest level progressive award), the gaming system shifts, advances or otherwise reassociates one or more of the remaining progressive awards to account for the provided progressive award as indicated in block 114. That is, to preserve the progressive award hierarchy (i.e., a progressive award of an MLP cannot have a higher value than any progressive awards associated with any higher levels of the MLP) after progressive award associated with any level other than the first or lowest level of the MLP is provided to the player, the gaming system shifts one or more progressive awards of the MLP. After shifting one or more progressive awards, the gaming system funds the lowest level progressive award of the MLP with a set value or amount and terminates the bonus event as indicated in blocks 110 and 112.

For example, as illustrated in FIG. 5A, an MLP configuration includes seven progressive award levels and the progressive award of $7.34 associated with the fourth progressive award level is provided to a player in the triggered bonus event. In this example, since the provided progressive award was associated with a higher level of the MLP than the lowest level, to preserve the hierarchy of the MLP, as seen in FIG. 5B, the gaming system shifts or reassociates the progressive award of $6.44 (previously associated with the third progressive award level) to the fourth progressive award level (which was vacant from being provided to the player), the progressive award of $6.11 (previously associated with the second progressive award level) to the third progressive award level (which was vacant from the previously described shift) and the progressive award of $5.18 (previously associated with the first or lowest progressive award level) to the second progressive award level (which was vacant from the previously described shift). In this example, in addition to shifting the progressive awards of the MLP, the gaming system funds the first or lowest progressive award level of the MLP with a set value or amount. Such a configuration encourages players to always play optimally as they will always be awarded best for doing so. That is, if the progressive award shift had not occurred and the progressive award associated with the fourth progressive award level was reset to the set value of $5.00, it is likely that some players would purposely play less than their best to win the progressive award of $6.44 associated with the third progressive award level instead of progressing to the fourth progressive award level and possibly only winning the recently funded progressive award of $5.00.

In one embodiment, the gaming system shifts at least one progressive award which is associated with a lower level of the MLP than the provided progressive award. In another embodiment, the gaming system shifts a plurality of progressive awards that are each associated with a lower level of the MLP than the provided progressive award. In another embodiment, the gaming system shifts each progressive award which is associated with a lower level of the MLP than the provided progressive award. In different embodiments, the number of any of the progressive awards which are shifted is predetermined, randomly determined, determined based on a player's status (determined through a suitable player tracking system), determined based on a random determination by the central controller, determined based on a random determination at the gaming device, determined based on one or more side wagers placed, determined based on the player's primary game wager, determined based on time (such as the time of day) or determined based on any other suitable method or criteria In different embodiments, which of any of the progressive awards that are shifted is predetermined, randomly determined, determined based on a player's status (determined through a suitable player tracking system), determined based on a random determination by the central controller, determined based on a random determination at the gaming device, determined based on one or more side wagers placed, determined based on the player's primary game wager, determined based on time (such as the time of day) or determined based on any other suitable method or criteria.

In another embodiment, one or more progressive award levels are each associated with a plurality of progressive awards. In this embodiment, if the central controller and/or gaming device processor determine that a progressive award associated with a selected one of the progressive award levels will be provided to a player, the central controller and/or gaming device processor subsequently determine which of the progressive awards of the selected progressive award level to provide to the player. In different embodiments, which progressive award of the selected progressive award level that is provided to the player is predetermined, randomly determined, determined based on a player's status (determined through a suitable player tracking system), determined based on a random determination by the central controller, determined based on a random determination at the gaming device, determined based on one or more side wagers placed, determined based on the player's primary game wager, determined based on time (such as the time of day), determined based on the play of a subsequent game or sequence or determined based on any other suitable method or criteria.

As mentioned above, in one embodiment, the bonus event incorporates one or more aspects of skill, knowledge or strategy for players to determine which one of the progressive awards will be provided to the player. In this embodiment, the progressive award provided to the player is determined, at least in part, based on the player's level of skill or strategy in the bonus event. However, introducing an element of player skill or strategy into the bonus event presents a mathematical challenge in determining how much money to allot for the bonus event, as skillful or strategic play may cost one amount and less skillful or strategic play may cost another amount.

In one embodiment, to account for the differences in how skillfully or strategically each player may play the triggered bonus event, the central controller and/or gaming device processor funds each triggered bonus event with the set value. That is, by utilizing the set value to fund the progressive award associated with the lowest level of the MLP, the gaming system combats the uncertainty of player behavior (i.e., how each player performs) during each triggered bonus event. Thus, by shifting the progressive awards such that the bottom progressive award level is funded with a set value each time the bonus event is triggered, any unknown game play elements associated with the introduction of player skill are eliminated. This eliminates uncertainty by accounting for player skill and strategy thus solving the mathematical considerations by creating a uniform cost for each triggered bonus event. Such a configuration provides that a degree of skill can be introduced in the bonus event because no matter how the player plays or which of the progressive awards of the MLP is actually provided to the player in the bonus event, the gaming system only needs to account for and fund the set value associated with the bottom progressive award. In other words, regardless of the introduction of player skill (which, as described above, eliminates a predictable probability for how often each game outcome will be generated and thus eliminates a predictable average expected payout for the triggering of the bonus event), the utilization of the set value in the gaming system disclosed herein provides that each triggering of the bonus event is associated with a predictable average expected payout.

In other words, no matter what events transpire during the bonus event, the gaming system distributes the set value as an outcome for the triggered bonus event. In this embodiment by shifting the progressive awards and setting the lowest level progressive award to the set or initial value for each play of the bonus event, the gaming system disclosed herein accounts for the differences in how each player may play the bonus event (i.e., introduces a level of player skill into the bonus event) without awarding experienced players by punishing inexperienced players. That is, since the gaming system only needs to account for and fund the set value associated with the bottom progressive award for each triggering of the bonus event, the cost incurred by the gaming system for triggering the bonus event is set regardless of how the player plays the bonus event and regardless of which of the progressive awards is provided to the player.

In the example illustrated in FIG. 5B, the gaming system funds $5.00 to account for the result of the triggered bonus event. In this example, it does not matter how the player plays (in terms of skill) or which progressive award is actually provided to the player. That is, no matter which progressive award is provided to the player, each time the bonus event is triggered, the gaming system will fund $5.00 to the progressive award associated with the lowest level of the MLP. It should be appreciated that the rest of the amount which fund each progressive award (i.e., any amount over the $5.00 set value) are accounted for based on the wagers placed on the gaming devices in the gaming system as described above.

As seen in FIGS. 6, 7A, 7B, 7C, 7D and 7E, in one example embodiment, the selected gaming device in the gaming system provides a multi-level skill or strategy based secondary game as the bonus event, wherein each level or round of the secondary game corresponds to one of the levels of the MLP. In this embodiment, the gaming device includes a base element and a plurality of player selections. The base element and each of the player selections have a plurality of characteristics.

In one embodiment, the gaming system assigns or associates one characteristic from each of the characteristic sets to the base element and to each player selection. It should be appreciated that more than one characteristic from each set could be assigned or associated with the base element and the player selections. In one embodiment, the gaming system randomly selects or assigns the characteristics to the base element and the player selections. In another embodiment, the gaming system includes an algorithm that assigns a weight factor to each characteristic, so that specific values of one characteristic set having higher weight factors have a greater chance of being selected. This may result in such specific characteristics having a greater chance of being associated with specific values of the other set or that such specific characteristics have a greater chance of being assigned to the base element or selections. This weight factor may be consistent throughout the entire bonus event or may change after each round of the bonus event. In different embodiments, which characteristics are assigned to each selection (and the base element) are predetermined, randomly determined, determined based on a player's status (determined through a suitable player tracking system), determined based on a random determination by the central controller, determined based on a random determination at the gaming device, determined based on one or more side wagers placed, determined based on the player's primary game wager, determined based on time (such as the time of day) or determined based on any other suitable method or criteria.

In one embodiment, the base element and the player selections that can be chosen are defined in a table. In this embodiment, the table is accessed by the central controller and/or gaming device processor and selections from the set are randomly chosen and presented to the player. Such a configuration enables a gaming system operator to control the probability of success by defining which selections will be available when. For example, more selections likely to have matching characteristics will be available for the earlier rounds of the bonus event (which correspond to the lower progressive award levels of the MLP), while less selections with matching characteristics will be available for the later rounds of the bonus event (which correspond to the higher progressive award levels of the MLP).

Figure 6:
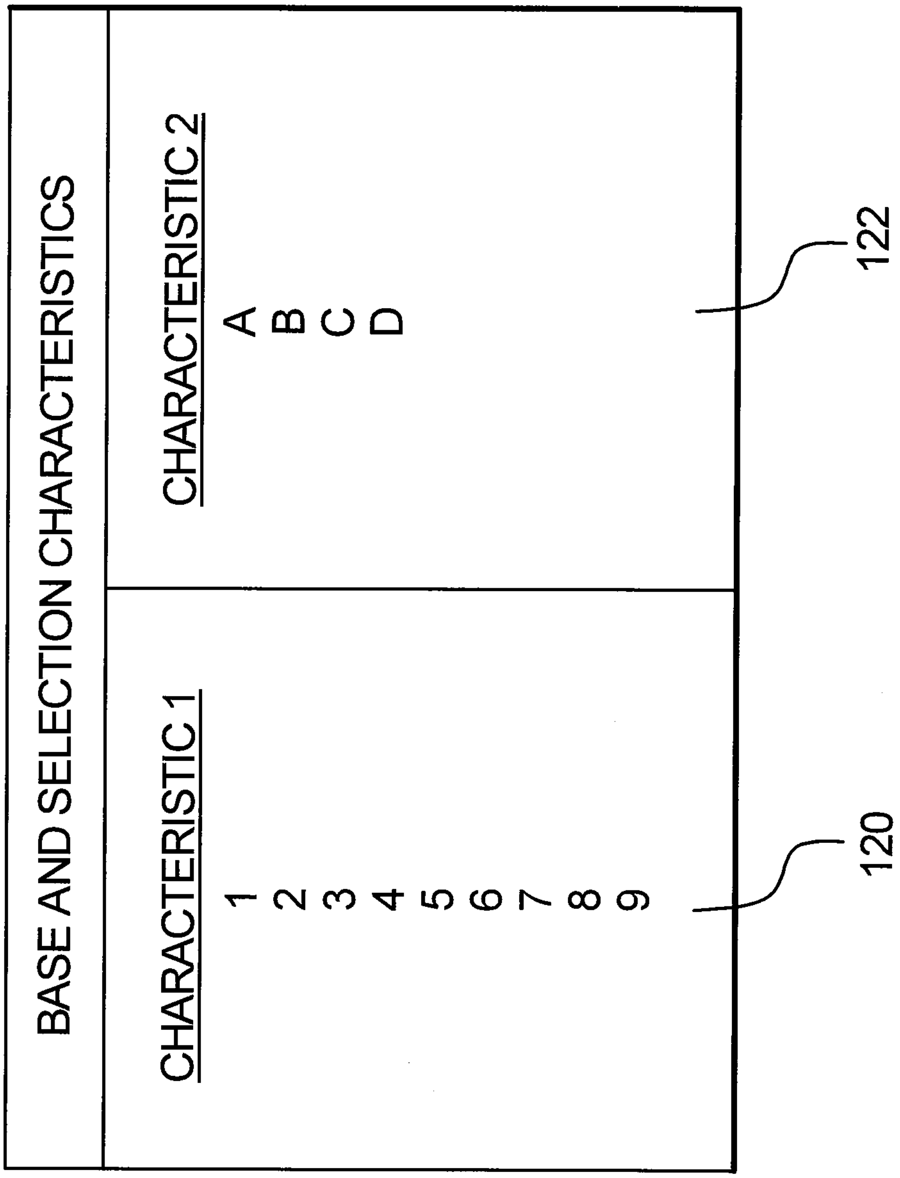
FIG. 6 is a table illustrating one example of the characteristics associated with a plurality of selections.

FIG. 6 illustrates one embodiment of the matching game having two sets of characteristics assigned to the base element and the player selections. It should be appreciated that while only two sets of characteristics are illustrated, two or more sets are contemplated. It should be further appreciated that any suitable number of each characteristic may be employed. In different embodiments, the number of sets of characteristics and/or the number of each characteristic is predetermined, randomly determined, determined based on a player's status (determined through a suitable player tracking system), determined based on a random determination by the central controller, determined based on a random determination at the gaming device, determined based on one or more side wagers placed, determined based on the player's primary game wager, determined based on time (such as the time of day) or determined based on any other suitable method or criteria.

As seen in FIG. 6, the first characteristic is a set of numbers consisting of numbers 1 through 9 (referred to as Characteristic 1 and generally designated 120) and the second characteristic is a set of letters consisting of letters A through D (referred to as Characteristic 2 and generally designated 122). It should be appreciated that while numbers and letters are illustrated as characteristics, any type of characteristics, such as characters, pictures and images, could be employed with the gaming system disclosed herein. In one embodiment, the sets of characteristics have some predetermined or logical relationship. For example, the sets could include values and suits associated with a deck of cards, months of the year and signs of the Zodiac, television programs and characters, sport teams and positions, cities and states. In another embodiment, the sets do not have any logical relationship. For example, one set includes colors and the other set includes numbers.

Figure 7A:
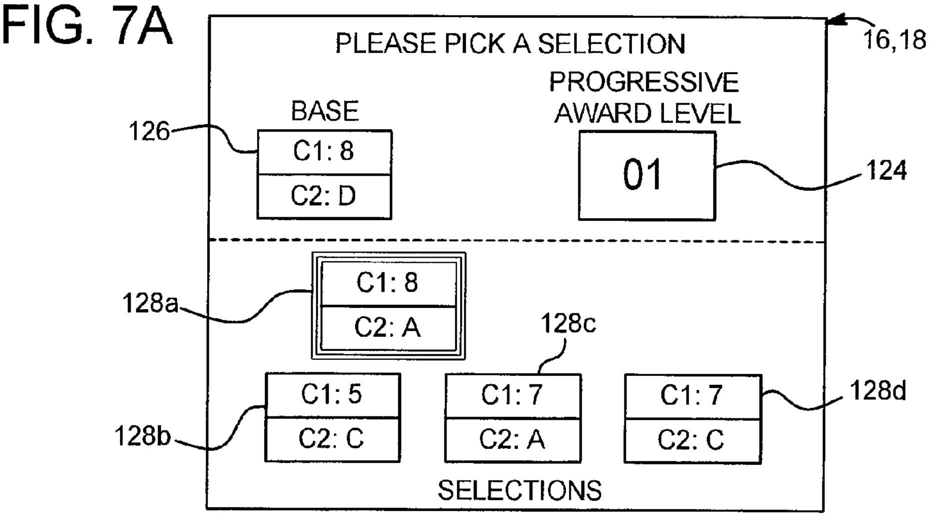
FIGS. 7A, 7B, 7C, 7D and 7E are front elevational views of a display of one embodiment of the bonus event disclosed herein illustrating selections having at least one characteristic that match at least one characteristic of a base selection.

As illustrated in FIG. 7A, beginning at the lowest or first level (as indicated by the progressive award level indicator 124), the gaming device provides and displays to the player a base element 126 and a plurality of player selections 128*a* to 128*d*. In different embodiments, the number of player selections provided and displayed to the player is predetermined, randomly determined, determined based on a players status (determined through a suitable player tracking system), determined based on a random determination by the central controller, determined based on a random determination at the gaming device, determined based on one or more side wagers placed, determined based on the player's primary game wager, determined based on time (such as the time of day) or determined based on any other suitable method or criteria.

In operation, the gaming device enables the player to pick, choose or select at least one selection from the plurality of selections having at least one characteristic that matches (i.e., that is the same as, equal to or equivalent to) at least one characteristic of the base element. Appropriate messages such as "PLEASE MAKE A MATCHING SELECTION" may be provided to the player visually, or through suitable audio or audiovisual displays.

During the first play of the matching game bonus event illustrated in FIG. 7A, the base element displays C1=8 and C2=D. Accordingly, the player looks for a selection having a characteristic matching either characteristic of the base element. In this illustrated embodiment, selection 128*a* has a characteristic C1=8 that matches C1 of the base element and thus the player selects indicated selection 128*a*. It should be appreciated that C1 and C2 are representative characteristics as described herein.

Figure 7B:
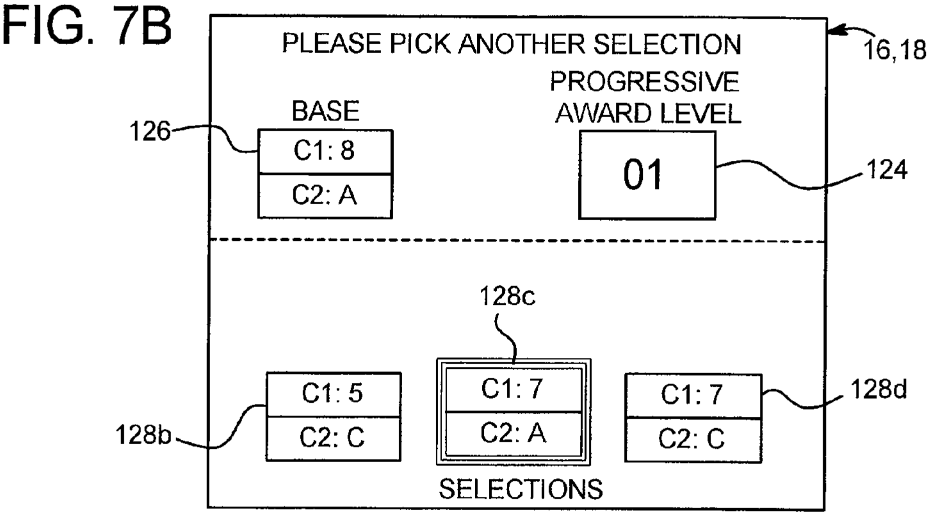

In one embodiment, if the player picks a selection that has at least one characteristic that matches one of the characteristics of the base element, the picked selection replaces the previous base element. As seen in FIG. 7B, the gaming device replaces C1 and C2 of the base element 126 with C1 and C2 of selection 128*a* (from FIG. 7A) and the gaming device displays base element 126 having C1=8 and C2=A. In another embodiment, if the player picks a selection that has at least one characteristic that matches one of the characteristics of the base element, the gaming device provides a new base element in a different manner such as selecting a new C1 and C2 from Characteristics 1 and 2 similar to that described above. Appropriate messages such as "PLEASE PICK ANOTHER SELECTION" may be provided to the player visually, or through suitable audio or audiovisual displays.

In one embodiment, after replacing the base element with the player picked selection, the gaming device eliminates or removes the player picked selection from the plurality of selections. In this embodiment, the gaming device proceeds as described above by enabling the player to pick at least one of any remaining provided selections that has at least one characteristic that matches one of the characteristics of the new base element. It should be appreciated that since the gaming device displays the characteristics associated with each of the provided selections at the onset of the secondary game and the player decides the order in which to pick the provided selections based on these displayed selections, this secondary game involves a degree of skill or strategy.

Figure 7C:
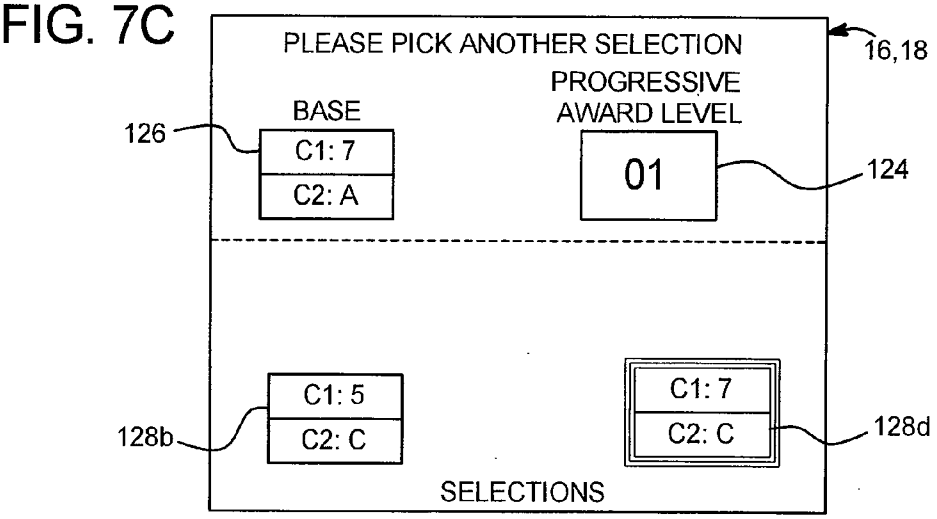
Figure 7D:
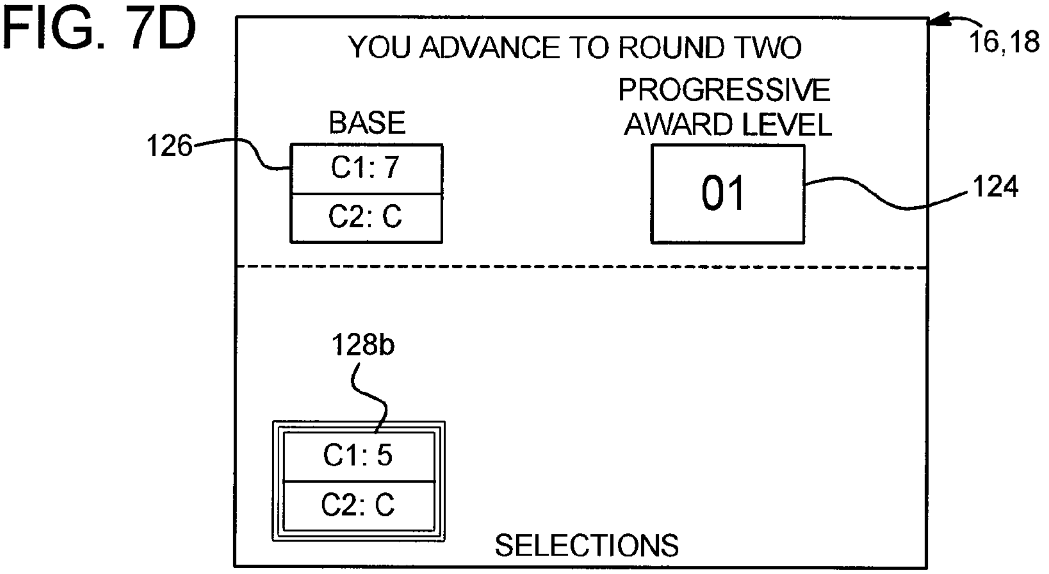

As illustrated in FIG. 7B, in this case, the player picked indicated selection 128*c* having C2=A that matches C2=A of the base element as illustrated. Again, the picked selection replaces the previous base element and the picked selection is eliminated from the plurality of available selections. The matching game of the bonus event continues, alternatively providing new bases with player picked selections and eliminating selections as illustrated in FIGS. 7C through 7D until no selections remain to be picked (i.e., the player has matched all of the provided selections for the current level) or the player is unable to pick a selection that has at least one characteristic that matches at least one characteristic of the base element.

Figure 7E:
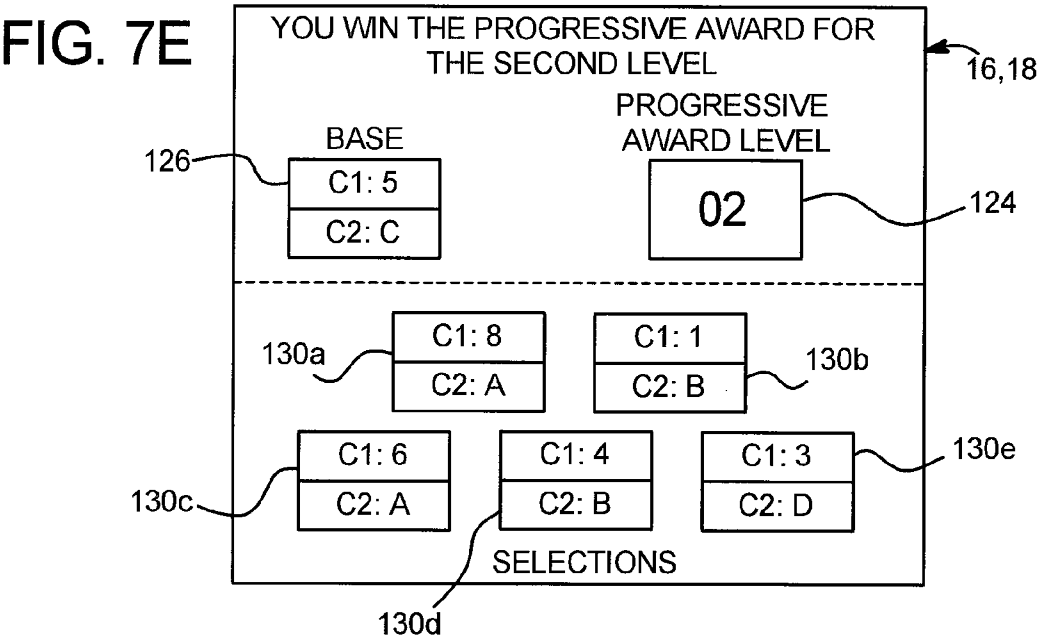

In one embodiment, if no selections remain to be picked (i.e., the player has matched all of the provided selections for the current secondary game level) and there is at least one higher level of the secondary game than the player's current level, the gaming device advances the player to the next higher level of the secondary game (which corresponds to the next higher progressive award level of the MLP). As illustrated in FIG. 7D, after the player picked the one remaining selection 128*b* which has at least one characteristic that matches one of the characteristics of the base element, selection 128*d* is eliminated and no selections remain. In this example, as illustrated in FIG. 7E, since there is at least one higher level or round of the secondary game, the bonus event proceeds to the next higher round (which corresponds to the next higher progressive award level of the MLP). Appropriate messages such as "YOU ADVANCE TO ROUND TWO" may be provided to the player visually, or through suitable audio or audiovisual displays.

In one embodiment, as illustrated in FIG. 7E, upon advancing to the next higher round, a new plurality of selections 130*a* to 130*e* are displayed and provided to the player and the previous picked selection from the previous round becomes the initial base element for this round. In another embodiment, upon advancing to the next higher round, a new plurality of selections and a new base element are displayed and provided to the player.

In one embodiment, as mentioned above, if the player is unable to pick a selection that has at least one characteristic that matches at least one characteristic of the base element, the gaming device terminates the bonus event and provides the player the progressive award associated with the progressive award level which corresponds to the player's current level in the bonus event. For example, as seen in FIG. 7E, since the player is unable to pick any selections that have at least one characteristic that matches one of the characteristics of the base element, the gaming device terminates the bonus event and provides the player the second level progressive award level of the MLP (which corresponds with the second level of the bonus event). Appropriate messages such as "YOU WIN THE PROGRESSIVE AWARD FOR THE SECOND LEVEL" may be provided to the player visually, or through suitable audio or audiovisual displays.

As described above, after the player is provided the progressive award associated with the second level of the MLP, one or more of the progressive awards (which are associated with levels of the MLP which are lower than the level of the provided progressive award) are shifted or otherwise advanced to account for the provided progressive award. In this embodiment, the lowest progressive level progressive award (which is temporality left vacant by the shifting of the progressive awards) is set to an initial or set value.

It should be appreciated that picking selections based on matching characteristics involves a level of skill or strategy. For example, if at least two available selections each have at least one characteristic that matches the characteristics of the base selection and the player picks a first one of the selections, the player may or may not proceed to the next progressive award level of the MLP. However, in this embodiment, if the player picks a second one of the selections, the player may proceed to the next progressive award level of the MLP. Thus, the player's strategy regarding which selection to pick, in which order, at which point in time determines, at least in part, which progressive award level of the MLP the player may advance to in this matching game bonus event. For example, as seen in FIG. 7A, if for selection 128*d*, the associated characteristics were C1: 3 and C2: D and the player had picked selection 128*d* (as opposed to illustrated picked selection 128*a*), then the player would have not been able to subsequently match any characteristics with the new base selection (formerly selection 128*d*) and the matching game bonus event would have terminated with the player not proceeded to the next progressive award level of the MLP.

In one embodiment (not shown), if no selections remain and there are no higher levels of the bonus event than the player's current level (i.e., the player is at the top level of the bonus event), the selected gaming device of the gaming system provides the player the top progressive award of the MLP (which corresponds to top level of the secondary game) and terminates the bonus event.

In another embodiment, the triggered bonus event includes providing a plurality of base elements that each have a plurality of characteristics. This embodiment proceeds as described above, wherein the player picks selections that have at least one characteristic that matches one of the characteristics of one of the base elements. In different embodiments, the number of base elements provided is predetermined, randomly determined, determined based on a player's status (determined through a suitable player tracking system), determined based on a random determination by the central controller, determined based on a random determination at the gaming device, determined based on one or more side wagers placed, determined based on the player's primary game wager, determined based on time (such as the time of day) or determined based on any other suitable method or criteria.

In one alternative embodiment, the gaming device provides the player one or more additional selections in the triggered bonus event. In this embodiment, if the player is unable to pick a selection that has at least one characteristic that matches at least one characteristic of the base element and the player has at least one additional selection remaining, the player may exchange the additional selection for another selection with a plurality of characteristics. If the player is unable to pick a selection that has at least one characteristic that matches at least one characteristic of the base element and the player does not have any additional selections remaining, then as described above, the gaming device terminates the secondary game and provides the player the player's current progressive award level of the MLP. In different embodiments, the number of additional selections provided is predetermined, randomly determined, determined based on a player's status (determined through a suitable player tracking system), determined based on a random determination by the central controller, determined based on a random determination at the gaming device, determined based on one or more side wagers placed, determined based on the player's primary game wager, determined based on time (such as the time of day) or determined based on any other suitable method or criteria.

In another embodiment, one or more of the selections have multi-part characteristics and/or functional elements. In one such embodiment, a multi-part characteristic matches more than one or multiple different characteristics of the base (i.e., similar to the function of a wild card). In another such embodiment, functional elements of selections cause the gaming device to perform actions such as, but not limited to, changing one or more characteristics of the base, changing one or more of the selection, changing one or more of the characteristics of one or more of the selections, adding another base, advancing one or more levels of the MLP and eliminating one or more selections. In different embodiments, the number of multi-part characteristics and/or any function elements of any player selections is predetermined, randomly determined, determined based on an applicable probability of occurring, determined based on a player's status (determined through a suitable player tracking system), determined based on a random determination by the central controller, determined based on a random determination at the gaming device, determined based on one or more side wagers placed, determined based on the player's primary game wager, determined based on time (such as the time of day) or determined based on any other suitable method or criteria.

Information Provided to Player

As indicated above, the progressive awards may be provided to the players of the gaming machines with or without explanation or information provided to the player, or alternatively information can be displayed to the player. In one embodiment, suitable information about the progressive awards can be provided to the players through one or more displays on the gaming machines or additional information displays positioned near the gaming machines, such as above a bank of system gaming machines. In one embodiment, a metering and/or information display device may be used to display information regarding the progressive awards. This information can be used to entertain the player or inform the player that a progressive award triggering event has occurred or will occur. Examples of such information are:

(1) that a bonus event has occurred;

(2) that a bonus event will shortly occur (i.e., foreshadowing the providing of a progressive award);

(3) that one or more progressive awards have been provided to one or more players of the system gaming machines;

(4) which gaming machines have won the progressive awards;

(5) the amount of the progressive awards won;

(6) the highest progressive award won;

(7) the lowest progressive award won;

(8) the average progressive award won;

(9) number of games played/total time since the last progressive award was won;

(10) the number of progressive awards won in a designated time period;

(11) the upper limit or range which one or more progressive awards can increment to;

(12) an average amount of time between each progressive award being won; and

(13) the value of each of the progressive awards in the MLP. It should be appreciated that such information can be provided to the players through any suitable audio, audio-visual or visual devices.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

at least one gaming device, each gaming device including at least one input device;

at least one display device; and at least one controller configured to operate with each of said at least one gaming device and said at least one display device to:

(a) maintain a progressive award, (b) display a value of the maintained progressive award, (c) display a first play of a primary game upon a first placement of a wager, (d) upon a progressive award increase event at a first point in time, increase the displayed value of the progressive award, (e) upon a triggering of a bonus event, provide the currently displayed value of the maintained progressive award, and (f) thereafter:

(i) display a second play of the primary game upon a second placement of the wager, and (ii) upon an occurrence of the progressive award increase event at a second point in time, increase the provided value of the progressive award.

2. The gaming system of claim 1, wherein the at least one controller is configured to operate to increase the displayed value of the progressive award at the first point in time based, at least in part, on the placement of the first wager.

3. The gaming system of claim 2, wherein the at least one controller is configured to operate to increase the provided value of the progressive award at the second point in time based, at least in part, on the placement of the second wager.

4. The gaming system of claim 1, wherein the triggering of the bonus event is based on at least one displayed event in at least one play of the primary game.

5. The gaming system of claim 1, wherein the triggering of the bonus event is independent of any displayed event in any plays of the primary game or any plays of any secondary games.

6. The gaming system of claim 1, wherein the at least one controller is configured to operate to provide the currently displayed value of the maintained progressive award based, at least in part, on at least one aspect of skill.

7. The gaming system of claim 1, wherein at least one of the wager and the progressive award is selected from the group consisting of: a quantity of monetary credits, a quantity of non-monetary credits, a quantity of promotional credits, a quantity of player tracking points, and a quantity of non-player tracking points.

8. A gaming system comprising:

at least one gaming device, each gaming device including at least one input device;

at least one display device; and at least one controller configured to operate with each of said at least one gaming device and said at least one display device to:

(a) maintain a progressive award, said progressive award having a reset value, (b) display a value of the maintained progressive award, (c) display a play of a primary game upon a placement of a wager, (d) upon a progressive award increase event, increase the displayed value of the progressive award, and (e) upon a triggering of a bonus event:

(i) provide the currently displayed value of the maintained progressive award, (ii) determine if a progressive award reset event occurs, (iii) if the progressive award reset event occurred, reset the displayed value of said progressive award to said reset value, and (iv) if the progressive award reset event did not occur, repeat (c) to (e), wherein the displayed value of said progressive award continues to increase from said provided value of said progressive award.

9. The gaming system of claim 8, wherein for at least one progressive award increase event, the at least one controller is configured to operate to increase the displayed value of the progressive award based, at least in part, on the placement of the wager.

10. The gaming system of claim 8, wherein the triggering of the bonus event is based on at least one displayed event in at least one play of the primary game.

11. The gaming system of claim 8, wherein the triggering of the bonus event is independent of any displayed event in any plays of the primary game or any plays of any secondary games.

12. The gaming system of claim 8, wherein the at least one controller is configured to operate to provide the currently displayed value of the maintained progressive award based, at least in part, on at least one aspect of skill.

13. The gaming system of claim 8, wherein at least one of the wager and the progressive award is selected from the group consisting of: a quantity of monetary credits, a quantity of non-monetary credits, a quantity of promotional credits, a quantity of player tracking points, and a quantity of non-player tracking points.

14. A method of operating a gaming system, said method comprising:

(a) causing at least one controller to execute a plurality of instructions to maintain a progressive award, (b) causing at least one display device to display a value of the maintained progressive award, (c) causing the at least one display device to display a first play of a primary game upon a first placement of a wager, (d) upon a progressive award increase event at a first point in time, causing the at least one controller to execute the plurality of instructions to increase the displayed value of the progressive award, (e) upon a triggering of a bonus event, providing the currently displayed value of the maintained progressive award, and (f) thereafter:

(i) causing the at least one display device to display a second play of the primary game upon a second placement of the wager, and (ii) upon an occurrence of the progressive award increase event at a second point in time, causing the at least one controller to execute the plurality of instructions to increase the provided value of the progressive award.

15. The method of claim 14, which includes causing the at least one controller to execute the plurality of instructions to increase the displayed value of the progressive award at the first point in time based, at least in part, on the placement of the first wager.

16. The method of claim 15, which includes causing the at least one controller to execute the plurality of instructions to increase the provided value of the progressive award at the second point in time based, at least in part, on the placement of the second wager.

17. The method of claim 14, wherein the triggering of the bonus event is based on at least one displayed event in at least one play of the primary game.

18. The method of claim 14, wherein the triggering of the bonus event is independent of any displayed event in any plays of the primary game or any plays of any secondary games.

19. The method of claim 14, which includes providing the currently displayed value of the maintained progressive award based, at least in part, on at least one aspect of skill.

20. The method of claim 14, wherein at least one of the wager and the progressive award is selected from the group consisting of: a quantity of monetary credits, a quantity of non-monetary credits, a quantity of promotional credits, a quantity of player tracking points, and a quantity of non-player tracking points.

21. The method of claim 14, which is provided through a data network.

22. The method of claim 21, wherein the data network is an internet.

23. A method of operating a gaming system, said method comprising:

(a) causing at least one controller to execute a plurality of instructions to maintain a progressive award, said progressive award having a reset value, (b) causing at least one display device to display a value of the maintained progressive award, (c) causing the at least one display device to display a play of a primary game upon a placement of a wager, (d) upon a progressive award increase event, causing the at least one controller to execute the plurality of instructions to increase the displayed value of the progressive award, and (e) upon a triggering of a bonus event:

(i) providing the currently displayed value of the maintained progressive award, (ii) causing the at least one controller to execute the plurality of instructions to determine if a progressive award reset event occurs, (iii) if the progressive award reset event occurred, causing the at least one controller to execute the plurality of instructions to reset the displayed value of said progressive award to said reset value, and (iv) if the progressive award reset event did not occur, repeating (c) to (e), wherein the displayed value of said progressive award continues to increase from said provided value of said progressive award.

24. The method of claim 23, which includes causing the at least one controller to execute the plurality of instructions to increase the displayed value of the progressive award based, at least in part, on the placement of the wager.

25. The method of claim 23, wherein the triggering of the bonus event is based on at least one displayed event in at least one play of the primary game.

26. The method of claim 23, wherein the triggering of the bonus event is independent of any displayed event in any plays of the primary game or any plays of any secondary games.

27. The method of claim 23, which includes providing the currently displayed value of the maintained progressive award based, at least in part, on at least one aspect of skill.

28. The method of claim 23, wherein at least one of the wager and the progressive award is selected from the group consisting of: a quantity of monetary credits, a quantity of non-monetary credits, a quantity of promotional credits, a quantity of player tracking points, and a quantity of non-player tracking points.

29. The method of claim 23, which is provided through a data network.

30. The method of claim 29, wherein the data network is an internet.

* * * * *

UNITED STATES PATENT AND TRADEMARK OFFICE

CERTIFICATE OF CORRECTION

PATENT NO. : 9,005,014 B2
APPLICATION NO. : 13/669984
DATED : April 14, 2015
INVENTOR(S) : Anthony J. Baerlocher It is certified that error appears in the above-identified patent and that said Letters Patent is hereby corrected as shown below:

IN THE CLAIMS

In Claim 2, Column 37, Line 42, between the first instance of “the” and “placement” insert --first--.
In Claim 2, Column 37, Line 42, delete “first”.
In Claim 3, Column 37, Line 46, between the first instance of “the” and “placement” insert --second--.
In Claim 3, Column 37, Line 46, delete “second”.
In Claim 15, Column 39, Line 7, between “the” and “placement” insert --first--.
In Claim 15, Column 39, Line 8, delete “first”.
In Claim 16, Column 39, Line 12, between “the” and “placement” insert --second--.
In Claim 16, Column 39, Line 13, delete “second”.

Signed and Sealed this
Twenty-second Day of September, 2015

Michelle K. Lee
*Director of the United States Patent and Trademark Office*